(12) United States Patent
Natu

(10) Patent No.: US 11,416,397 B2
(45) Date of Patent: Aug. 16, 2022

(54) GLOBAL PERSISTENT FLUSH

(71) Applicant: Intel Corporation, Santa Clara, CA (US)

(72) Inventor: Mahesh S. Natu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 16/796,861

(22) Filed: Feb. 20, 2020

(65) Prior Publication Data
US 2020/0192798 A1 Jun. 18, 2020

Related U.S. Application Data

(60) Provisional application No. 62/914,788, filed on Oct. 14, 2019.

(51) Int. Cl.
*G06F 12/0804* (2016.01)
*G06F 11/07* (2006.01)
*G06F 12/12* (2016.01)

(52) U.S. Cl.
CPC ........ *G06F 12/0804* (2013.01); *G06F 11/073* (2013.01); *G06F 11/0751* (2013.01); *G06F 11/0778* (2013.01); *G06F 12/12* (2013.01); *G06F 2212/1032* (2013.01)

(58) Field of Classification Search
CPC .... G06F 12/0804; G06F 12/12; G06F 11/073; G06F 11/0751; G06F 11/0778; G06F 11/1004; G06F 2212/1032
See application file for complete search history.

(56) References Cited

U.S. PATENT DOCUMENTS

| | | | | |
|---|---|---|---|---|
| 3,838,682 A | * | 10/1974 | Clark | G01N 35/00594 600/325 |
| 4,398,189 A | * | 8/1983 | Pasierb, Jr | G06T 15/80 463/33 |
| 5,142,634 A | * | 8/1992 | Fite | G06F 9/3806 712/240 |
| 5,301,287 A | * | 4/1994 | Herrell | G06F 12/0835 711/202 |
| 6,546,462 B1 | * | 4/2003 | Palanca | G06F 12/0804 711/146 |
| 6,711,653 B1 | * | 3/2004 | Quach | G06F 12/0891 711/146 |
| 10,019,354 B2 | * | 7/2018 | Jayakumar | G06F 12/0868 |

(Continued)

*Primary Examiner* — Ramon A. Mercado
(74) *Attorney, Agent, or Firm* — Alliance IP, LLC

(57) ABSTRACT

A cache flush request is received in a first phase of a persistent memory flush flow, where the first phase is initiated by a host processor, and the cache flush request requests that data in cache memory be flushed to persistent memory within a system. A cache flush response is sent in the first phase responsive to the cache flush request, where the cache flush response identifies whether an error is detected in the first phase. A memory buffer flush request is received in a second phase of the persistent memory flush flow, where the second phase is initiated by the host processor upon completion of the first phase, and the memory buffer flush request requests that data in buffers of persistent memory devices in the system be flushed to persistent memory. A memory buffer flush response is sent in the second phase responsive to the memory buffer flush response.

20 Claims, 20 Drawing Sheets

(56) References Cited

U.S. PATENT DOCUMENTS

| | | | |
|---|---|---|---|
| 2002/0156972 A1* | 10/2002 | McKnight | G06F 12/0804 |
| | | | 711/E12.04 |
| 2015/0120978 A1* | 4/2015 | Kalyanasundharam | ..................... |
| | | | G06F 12/1009 |
| | | | 710/267 |
| 2016/0092223 A1* | 3/2016 | Wang | G06F 9/30145 |
| | | | 712/208 |
| 2020/0192798 A1* | 6/2020 | Natu | G06F 11/0751 |

* cited by examiner

| 31:16 | 15 | 14:8 | 7:0 |
|---|---|---|---|
| | Rsvd | PM Agent ID _1220_ | Logical OpCode = 06 _1215_ |
| Parameter[7:0], Bit 0=1 if host request, else device response _1225_ | | | |
| Payload[27:24] indicates which Extended Payload fields carry valid error source info, e.g., Bit 24 maps to Extended Payload[15:0], etc. (only valid for device responses) | | | |
| Payload[17:16] = Phase (1 = cache flush; 2 = memory (buffer) flush) | | | |
| Payload[9] = 1 if error during cache flush phase (only valid if Phase=Memory Flush) | | | |
| Payload[8] = 1 if powerfail is imminent _1230_ | | | |
| Extended Payload[31:16] = Error source info[1], valid for device response and if payload[25]=1 _1240_ | | Extended Payload[15:0] = Error source info[0], valid for device response and if payload[24]=1 _1235_ | |
| Extended Payload[63:48] = Error source info[3], valid for device response and if payload[27]=1 _1250_ | | Extended Payload[47:32] = Error source info[2], valid for device response and if payload[26]=1 _1245_ | |

GLOBAL PERSISTENT FLUSH

This application claims benefit to U.S. Provisional Patent Application Ser. No. 62/914,788, filed Oct. 14, 2019 and incorporated by reference herein in its entirety.

FIELD

This disclosure pertains to computing system, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

BRIEF DESCRIPTION OF THE DRAWINGS

FIGS. 12A-12B represent example message formats for use in a persistent memory flush flow.

DETAILED DESCRIPTION

Figure 1:
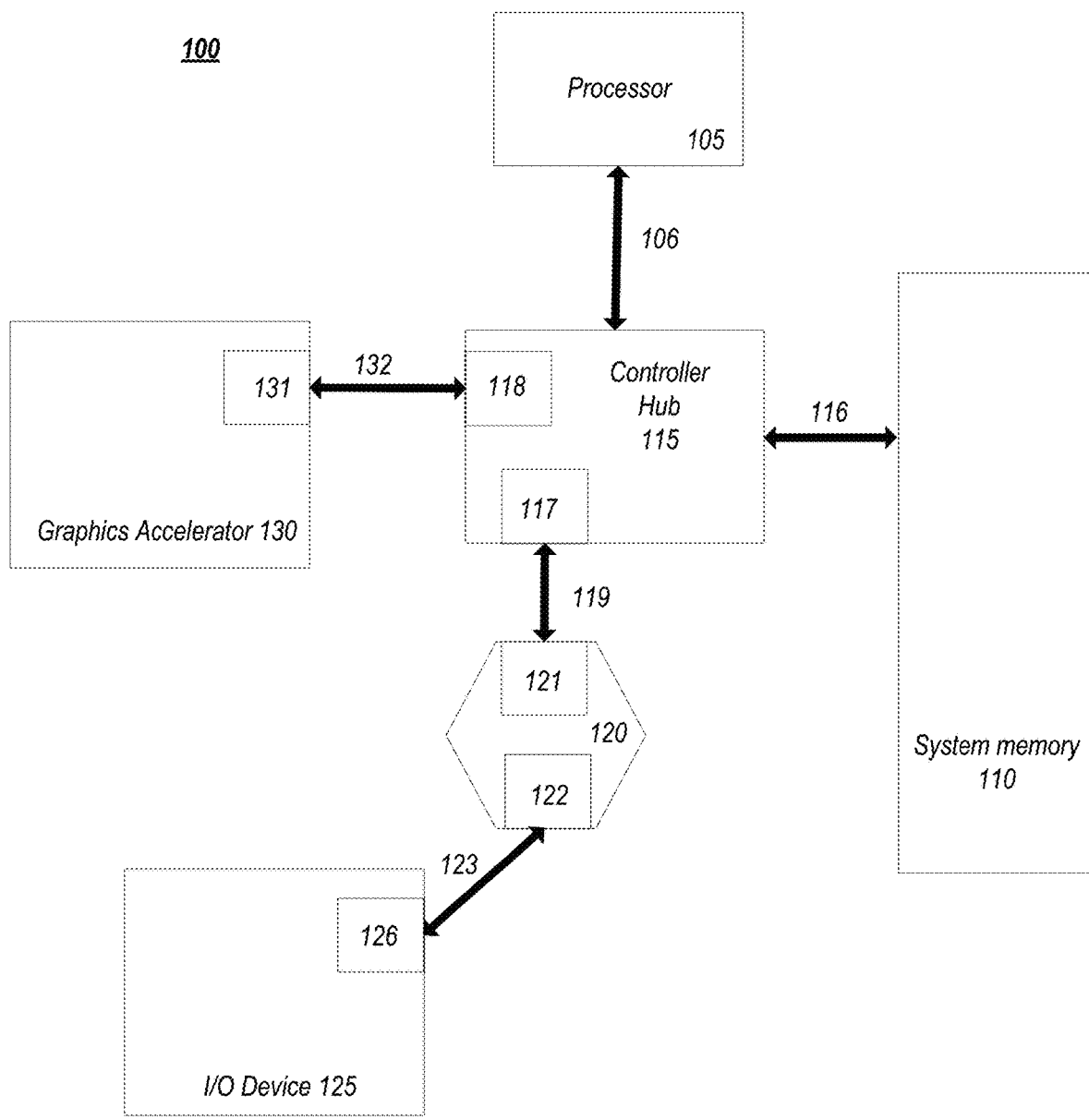
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
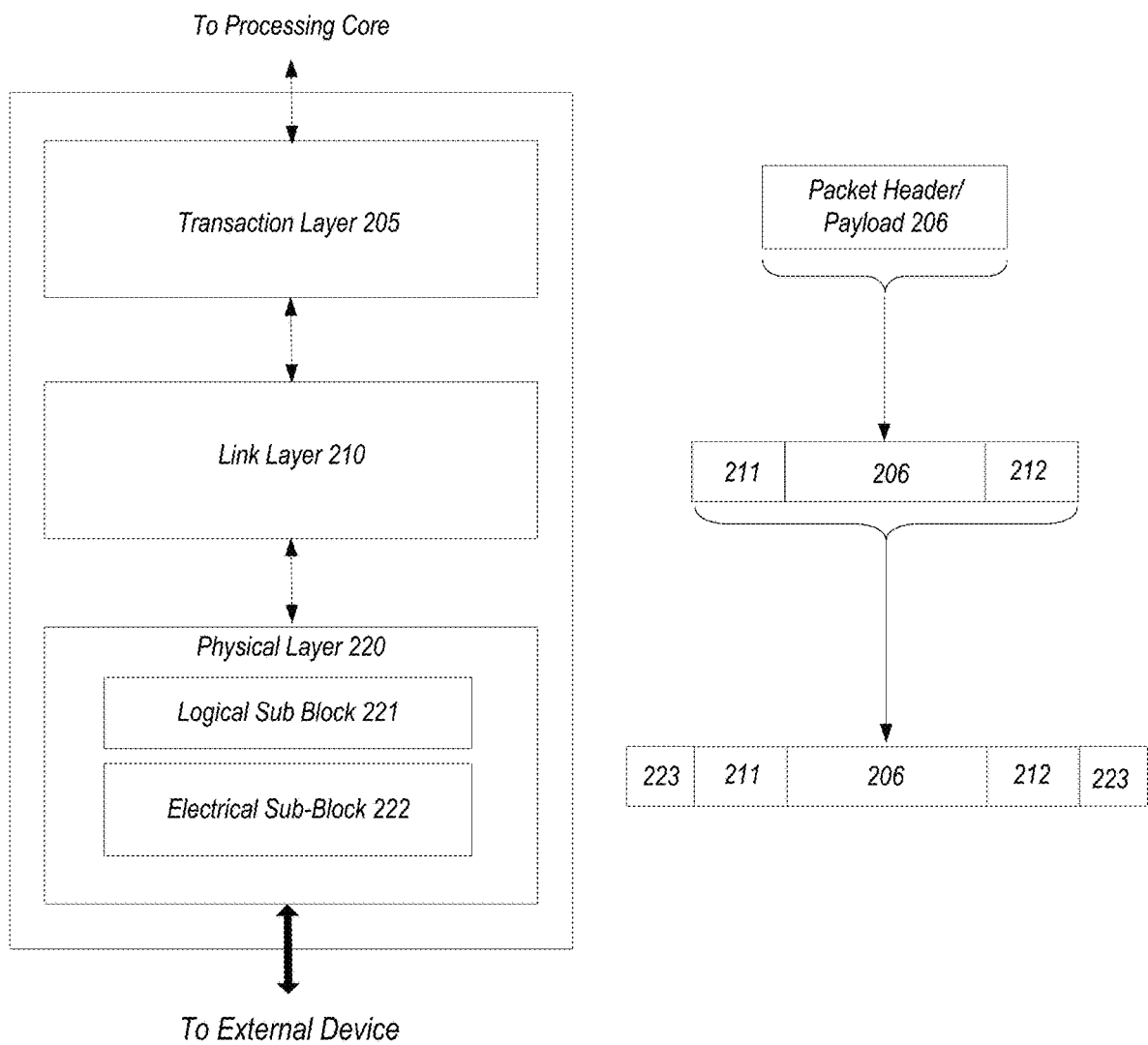
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
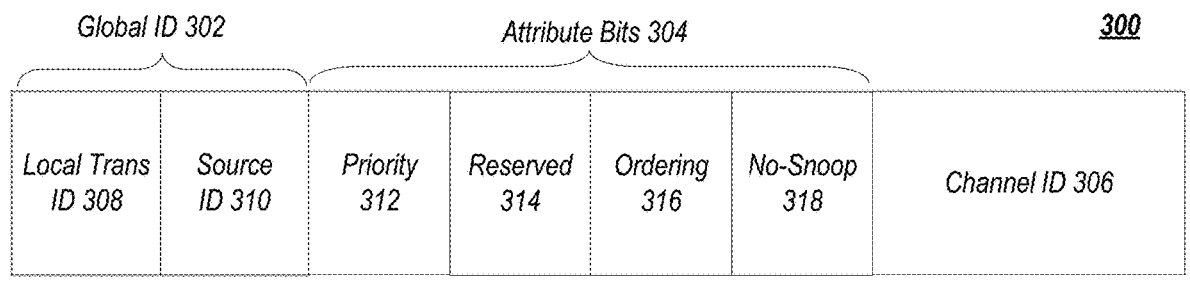
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
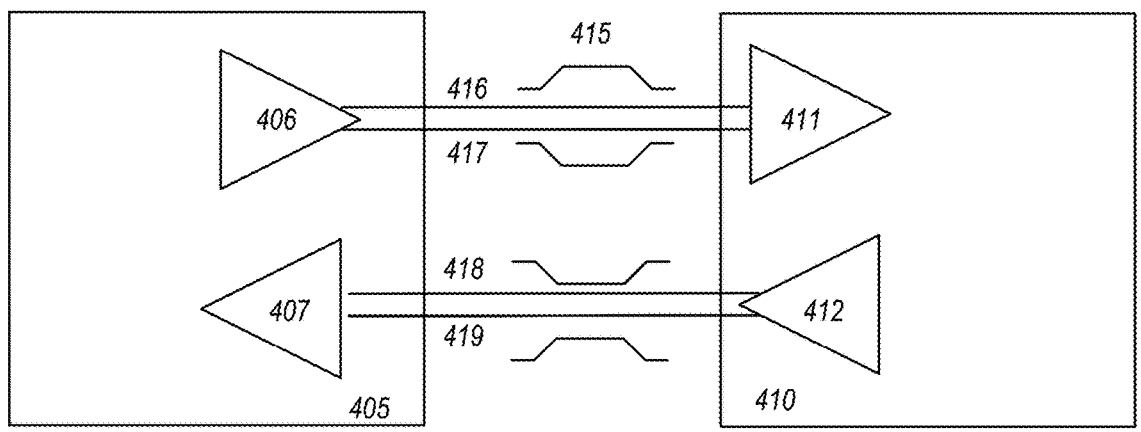
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

A variety of interconnect architectures and protocols may utilize the concepts discussed herein. With advancements in computing systems and performance requirements, improvements to interconnect fabric and link implementations continue to be developed, including interconnects based on or utilizing elements of PCIe or other legacy interconnect platforms. In one example, Compute Express Link (CXL) has been developed, providing an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 5:
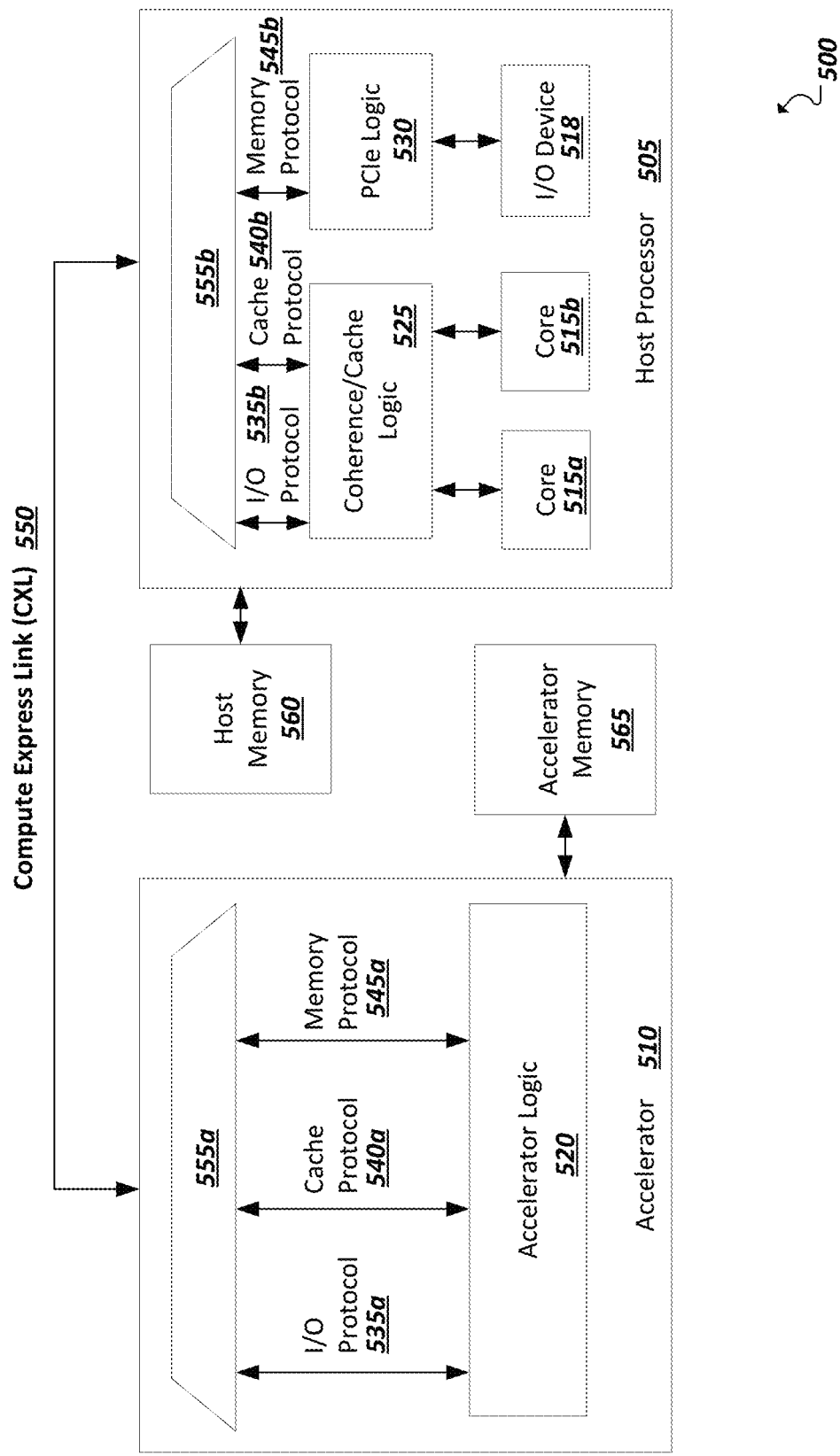
FIG. 5 illustrates an example implementation of a computing system including a host processor and an accelerator coupled by a link.

Turning to FIG. 5, a simplified block diagram 500 is shown illustrating an example system utilizing a CXL link 550. For instance, the link 550 may interconnect a host processor 505 (e.g., CPU) to an accelerator device 510. In this example, the host processor 505 includes one or more processor cores (e.g., 515*a-b*) and one or more I/O devices (e.g., 518). Host memory (e.g., 560) may be provided with the host processor (e.g., on the same package or die). The accelerator device 510 may include accelerator logic 520 and, in some implementations, may include its own memory (e.g., accelerator memory 565). In this example, the host processor 505 may include circuitry to implement coherence/cache logic 525 and interconnect logic (e.g., PCIe logic 530). CXL multiplexing logic (e.g., 555*a-b*) may also be provided to enable multiplexing of CXL protocols (e.g., I/O protocol 535*a-b* (e.g., CXL.io), caching protocol 540*a-b* (e.g., CXL.cache), and memory access protocol 545*a-b* (CXL.mem)), thereby enabling data of any one of the supported protocols (e.g., 535*a-b*, 540*a-b*, 545*a-b*) to be sent, in a multiplexed manner, over the link 550 between host processor 505 and accelerator device 510.

In some implementations, a Flex Bus™ port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 6:
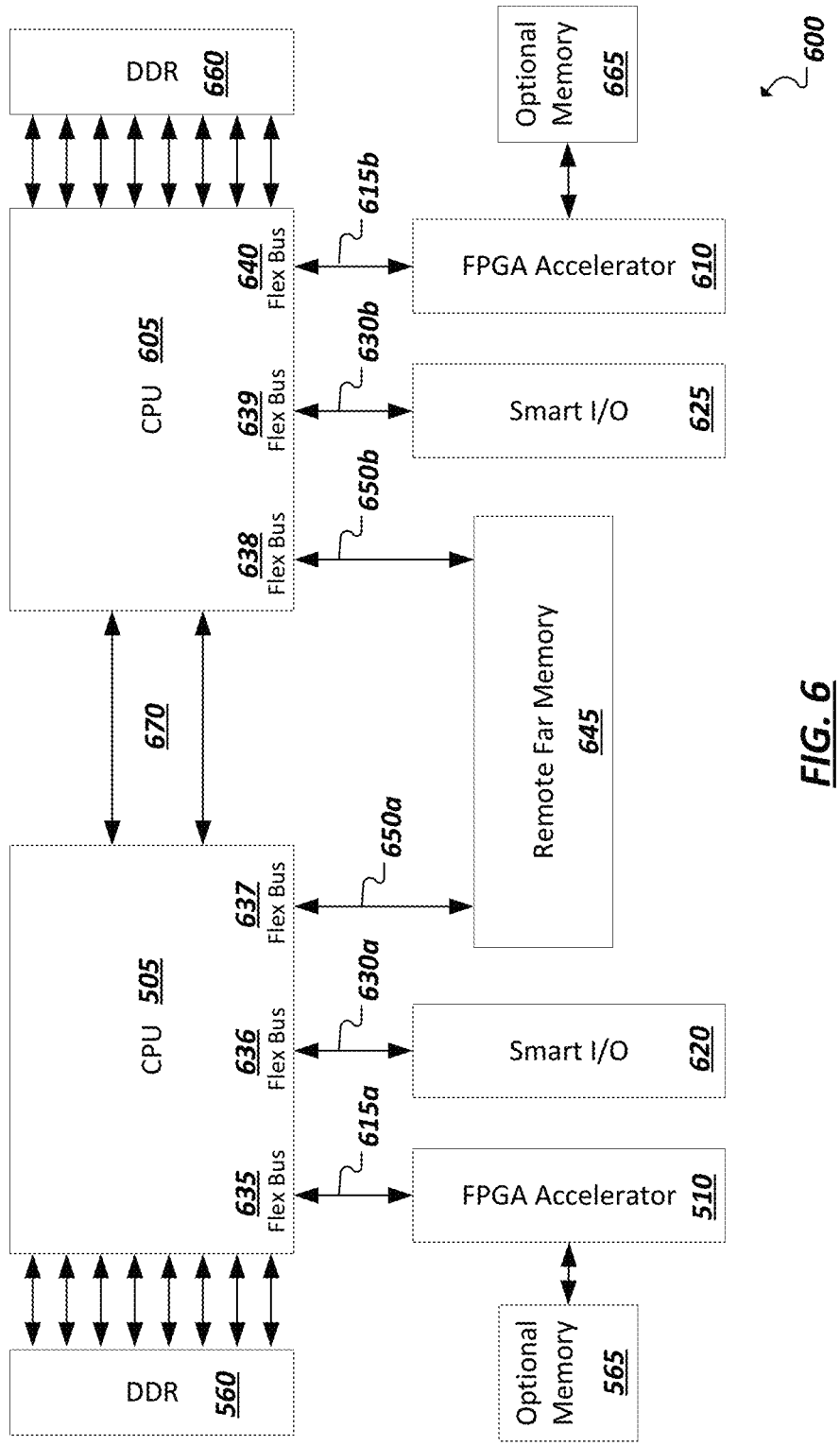
FIG. 6 illustrates an example implementation of a computing system including two or more interconnected processor devices.

Turning to FIG. 6, an example is shown (in simplified block diagram 600) of a system utilizing Flex Bus ports (e.g., 635-640) to implement CXL (e.g., 615*a-b*, 650*a-b*) and PCIe links (e.g., 630*a-b*) to couple a variety of devices (e.g., 510, 610, 620, 625, 645, etc.) to a host processor (e.g., CPU 505, 605). In this example, a system may include two CPU host processor devices (e.g., 505, 605) interconnected by an inter-processor link 670 (e.g., utilizing a UltraPath Interconnect (UPI), Infinity Fabric™, or other interconnect protocol). Each host processor device 505, 605 may be coupled to local system memory blocks 560, 660 (e.g., double data rate (DDR) memory devices), coupled to the respective host processor 505, 605 via a memory interface (e.g., memory bus or other interconnect).

As discussed above, CXL links (e.g., 615*a*, 650*b*) may be utilized to interconnect a variety of accelerator devices (e.g., 510, 610). Accordingly, corresponding ports (e.g., Flex Bus ports 635, 640) may be configured (e.g., CXL mode selected) to enable CXL links to be established and interconnect corresponding host processor devices (e.g., 505, 605) to accelerator devices (e.g., 510, 610). As shown in this example, Flex Bus ports (e.g., 636, 639), or other similarly configurable ports, may be configured to implement general purpose I/O links (e.g., PCIe links) 630a-b instead of CXL links, to interconnect the host processor (e.g., 505, 605) to I/O devices (e.g., smart I/O devices 620, 625, etc.). In some implementations, memory of the host processor 505 may be expanded, for instance, through the memory (e.g., 565, 665) of connected accelerator devices (e.g., 510, 610), or memory extender devices (e.g., 645, connected to the host processor (s) 505, 605 via corresponding CXL links (e.g., 650a-b) implemented on Flex Bus ports (637, 638), among other example implementations and architectures.

Figure 7:
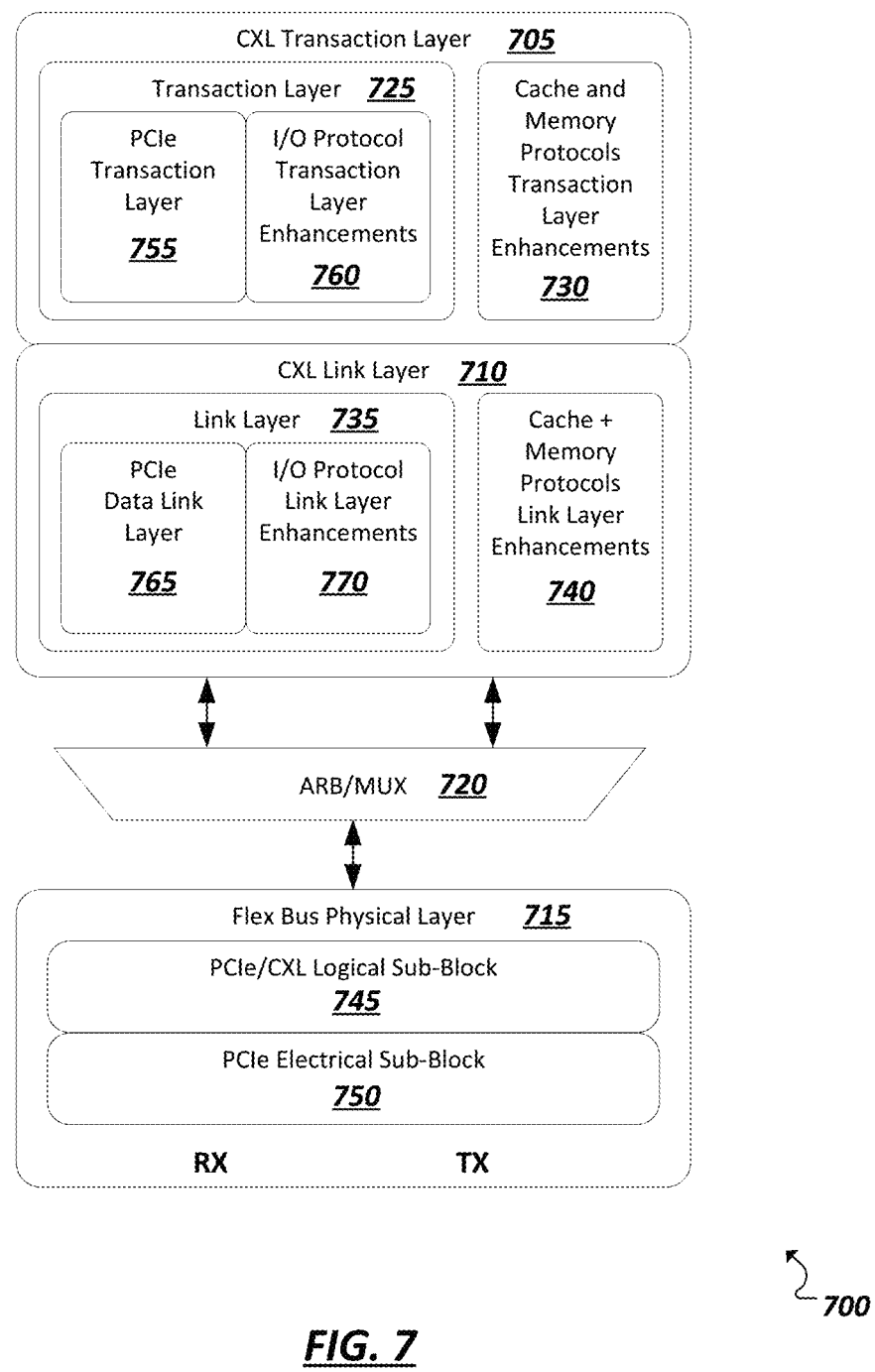
FIG. 7 illustrates a representation of an example port of a device including a layered stack.

FIG. 7 is a simplified block diagram illustrating an example port architecture 700 (e.g., Flex Bus) utilized to implement CXL links. For instance, Flex Bus architecture may be organized as multiple layers to implement the multiple protocols supported by the port. For instance, the port may include transaction layer logic (e.g., 705), link layer logic (e.g., 710), and physical layer logic (e.g., 715) (e.g., implemented all or in-part in circuitry). For instance, a transaction (or protocol) layer (e.g., 705) may be subdivided into transaction layer logic 725 that implements a PCIe transaction layer 755 and CXL transaction layer enhancements 760 (for CXL.io) of a base PCIe transaction layer 755, and logic 730 to implement cache (e.g., CXL.cache) and memory (e.g., CXL.mem) protocols for a CXL link. Similarly, link layer logic 735 may be provided to implement a base PCIe data link layer 765 and a CXL link layer (for CXl.io) representing an enhanced version of the PCIe data link layer 765. A CXL link layer 710 may also include cache and memory link layer enhancement logic 740 (e.g., for CXL.cache and CXL.mem).

Continuing with the example of FIG. 7, a CXL link layer logic 710 may interface with CXL arbitration/multiplexing (ARB/MUX) logic 720, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 715 based on a PCIe physical layer (e.g., PCIe electrical PHY 750). For instance, a Flex Bus physical layer may be implemented as a converged logical physical layer 745 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 700 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some computing systems, persistent data is cached or temporarily held in buffers to enhance performance of the system. When the system is operating, these caches and data buffers may hold data that an application understands to have been written to the persistent memory, but which has not in fact made it to the persistent memory. In cases of asynchronous events, such as power fail, the system may utilize flushes to ensure this in-flight data is written to the persistent memory to ensure consistency with the application's view. In traditional computer architectures, including conventional server designs, flushing cache and other data stored in volatile memory to persistent memory is limited to flushing CPU caches and persistent memory directly attached to CPU. However, through the introduction of CXL topologies and protocols, the caches and persistent memory of a system will not be so limited and may be located outside of a host processor (e.g., CPU) anywhere in a CXL tree. For instance, the CXL tree in a system may include CXL attached devices including accelerators (that may cache persistent memory) and attached persistent memory expanders, among other example elements. Traditional solutions assume a more centralized model where caches are part of the CPU and persistent memory (e.g., dual in-line memory module (DIMM) devices) is directly attached to the CPU, allowing the CPU to handle any such flushes locally.

In improved implementations, a CXL link (and the protocol agents on the devices coupled by the link) may support asynchronous DRAM refresh, or a global persistent flush (GPF) protocol or flow. Global persistent flush may be implemented as a hardware-based mechanism associated with persistent memory that is used to flush cache and memory buffers to the persistent domain. GPF may be triggered by specific events where the software is not able to flush the data, such as in response to an indication of an imminent power loss or non-graceful reset, among other examples. Additionally, CXL agents may utilize messaging associated with a GPF flow to detect and identify errors, which may occur during attempted flushing to persistent memory. Enabling errors to be detected through the GPF glow may be particular important given that the persistent data (relied upon by the system's applications) is at stake and any possible loss of persistent data should be tracked to ensure correct and trusted operation, among other example advantages and considerations.

As discussed herein, protocol agents implemented on a device (e.g., through hardware circuitry, firmware, and/or software) may implement a GPF flow on a link (e.g., a CXL link) connecting a processor to one or more external devices (e.g., accelerator devices). In one example implementation, the GPF flow may include two phases: first, a cache flush phase and, second, a memory or buffer flush phase with a logical barrier being enforced (e.g., by the initiating CPU) between the two phases. Further, error detection and reporting may be communicated during the GPF flow, such as any device errors or timeouts during either or both phases, with any errors being communicated back to the CPU for logging. Additionally, should a cache flush phase error be reported, the CPU may include an indication of the cache flush phase error when initiating the next phase, the buffer flush phase (e.g., setting one or more fields in a message sent on the link to initiate the buffer flush phase, to identify the error) so persistent memory devices can likewise log a corresponding "dirty shutdown" condition, among other example features. Such features may facilitate broader adoption of the supporting interconnect (e.g., CXL) and enhance host processor and persistent memory devices compatible with such interconnect technologies, among other example advantages.

Figure 8:
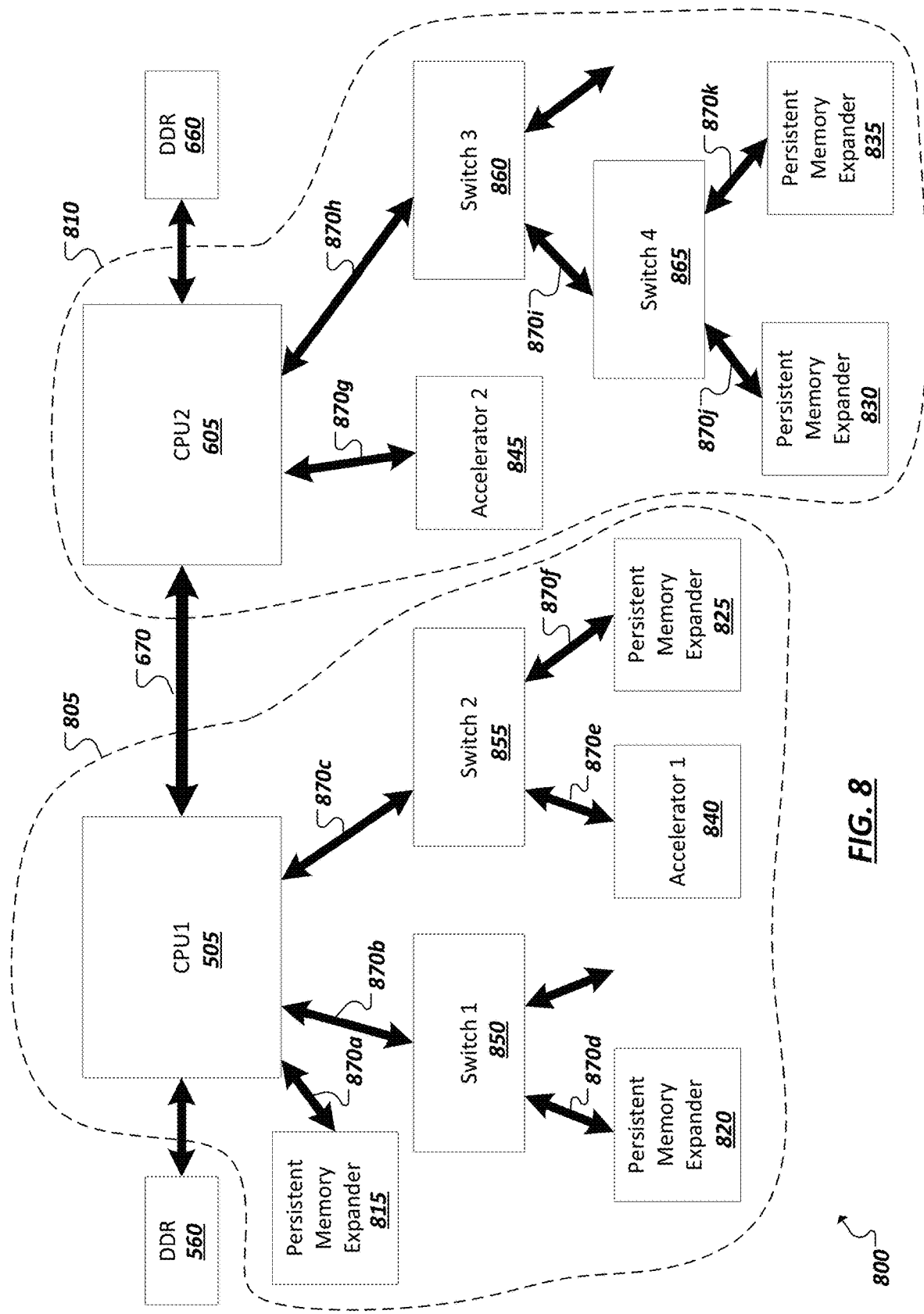
FIG. 8 illustrates an example computing system including two interconnected trees of devices.

Turning to FIG. 8, an example system topology is illustrated through simplified block diagram 800. In this example, two CPU devices 505, 605 are interconnected by a link 670 adapted to couple two processor devices, such as an UPI, Infinity Fabric, or other inter-processor link. Each CPU 505, 605 may likewise be connected (via memory busses) to respective local system memory, such as DDR memory elements 560, 660. CXL links (e.g., 870*a-k*) may be utilized to construct "trees" 805, 810 beneath each CPU 505, 605, each tree 805, 810 including one or more additional devices, including accelerator devices (e.g., 840, 845) and memory expander devices (e.g., 815, 820, 825, 830, 835). In some implementations, switch elements (e.g., 850, 855, 860, 865) may also be included within CXL trees and may be utilized to route traffic to devices positioned downstream from the corresponding CPU and switch. For instance, Switch 2 855 may connect to Accelerator 1 840 and Persistent Memory Expander 825 and route traffic received from CPU 505 to either device and likewise route traffic originating from accelerator 840 or memory expander 825 upstream to the CPU 505. In some implementations, the details and attributes of devices connected downstream from a switch may be at least partially "hidden" from the CPU (e.g., 505, 605) governing the corresponding CXL tree, such that the CPU does not communicate directly with devices below the switch. The interconnection 670 of the host processors 505, 605 can enable the interconnection of the trees 805, 810 thereby allowing the combination of processor, accelerator, and memory elements to operate, share resources, and function as a single system.

In some implementations, a host processor (e.g., 505, 605) can initiate CXL functions and flows involving devices within its respective tree (e.g., 805 and 810 respectively).

For instance, a CXL GPF flow may be initiated by each host processor (e.g., 505, 605) in a system in an coordinated manner (e.g., utilizing messaging between the host processors) to initiate and govern the GPF flow (and corresponding flushing of cache data to persistent memory) within its respective CXL tree (e.g., 805, 810). For instance, turning to the example illustrated in the simplified block diagrams 900*a-e* of FIGS. 9A-9E, a GPF flow may be implemented through the sending of messages (e.g., GPF requests and responses) according to a defined GPF flow or protocol. A GPF or cache flush flow may be initiated based on the detection of an event configured to initiate the GPF flow. Events may include examples such as power failure events, fatal system errors (e.g., from which the software cannot continue), abnormal shutdown or reset events, and other events where the software is unable to flush caches to the persistent memory domain. Such events may be predefined (e.g., in a register) or dynamically identified to cause a host processor to initiate a GPF flow and other cache flush events. For instance, in the example of FIG. 9A, a host processor 505 may detect an event or may receive an indication of an event from another device within its CXL tree. In response, the host processor 505 may initiate a cache flush for the entire system. This may involve sending flush requests (e.g., 905) according to an interprocessor protocol (e.g., governing the link connecting CPUs 505, 605) to convey the initiation of the cache flush to any other host processor devices (e.g., 605) in the system. Likewise, flush requests (e.g., 910*a*, 910*b*) of other protocols of other links used in the system may also be sent to convey flush request to devices connected via such links.

Figure 9A:
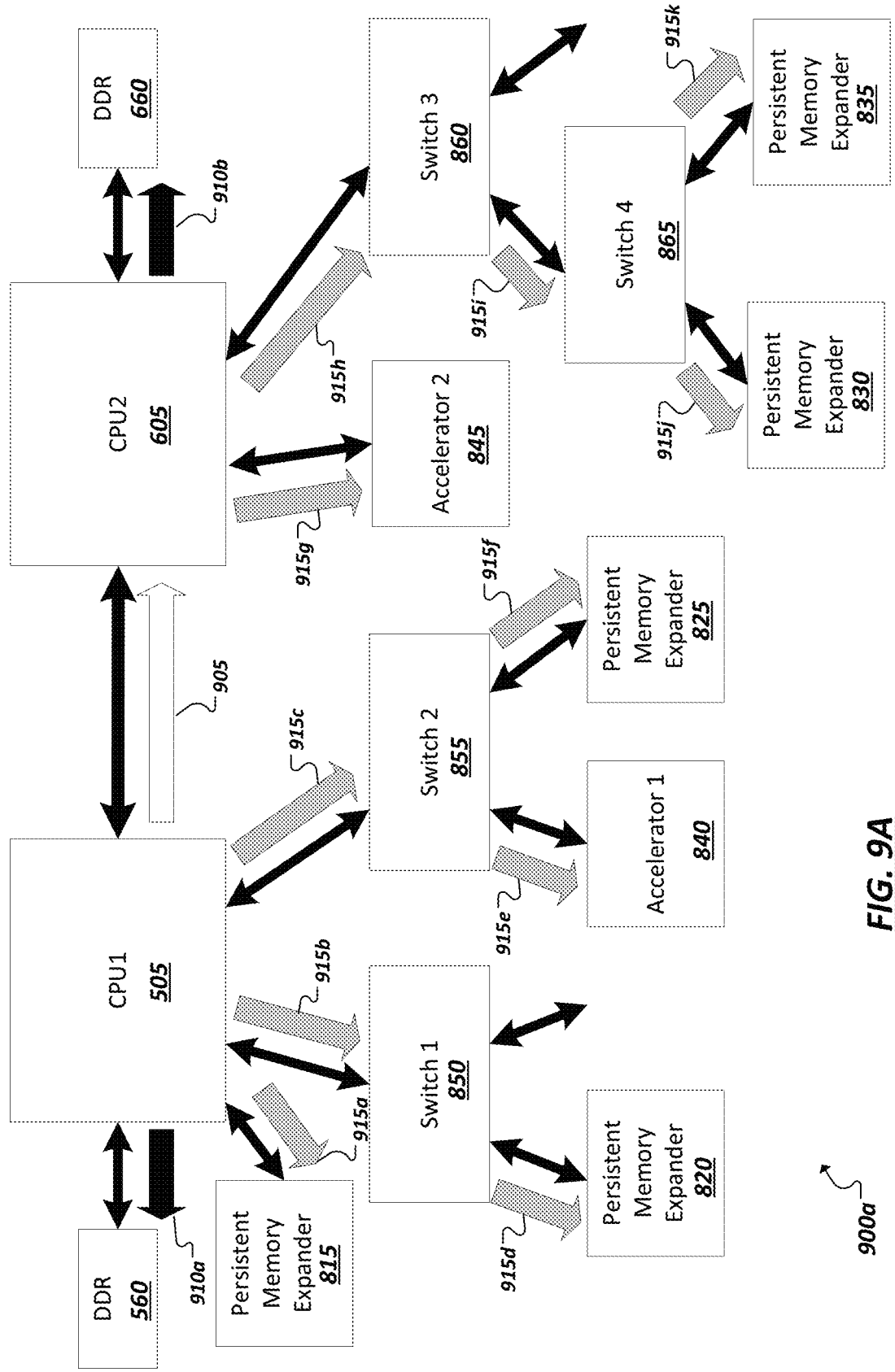
FIGS. 9A-9E illustrate an example persistent memory flush flow.

In the example of FIG. 9A, in response to identifying an event, CPU 505 initiates a cache flush by sending a flush message 905 (e.g., a UPI flush message) to CPU 605, a flush request 910*a* according to a memory bus protocol to memory block 560, and initiating a CXL GPF flow. In one example, the CXL GPF flow may take place in two phases: a first cache flush phase followed by a second buffer flush phase. Accordingly, to initiate the GPF flow, CPU 505 may send a set of CXL GPF cache flush request messages (e.g., 915*a-c*) to memory expander device 815 and switches 850, 855 that are directly connected to the CPU 505 by respective CXL links. As flush message 905 notifies CPU 605 of the flush event, CPU 605 may likewise transmit GPF cache flush request messages (e.g., 915*g*, 915*h*) (and any other flush request messages (e.g., 910*b*)) to devices (e.g., 660, 845, 860) directly connected to the CPU 605. Switches (e.g., 850, 855, 860, 865) that receive a GPF request message (e.g., 915*b*, 915*c*, 915*h*, 915*i*) may cause additional instances (e.g., 915*d*, 915*e*, 915*f*, 915*i*, 915*j*, 915*k*) of the received GPF request message to be forwarded to downstream devices (e.g., 820, 825, 830, 835, 840, 865) and communicate the GPF cache flush throughout the CXL trees of the system. Non-CXL flush requests may be handled in accordance with the respective protocols governing these links.

Figure 9B:
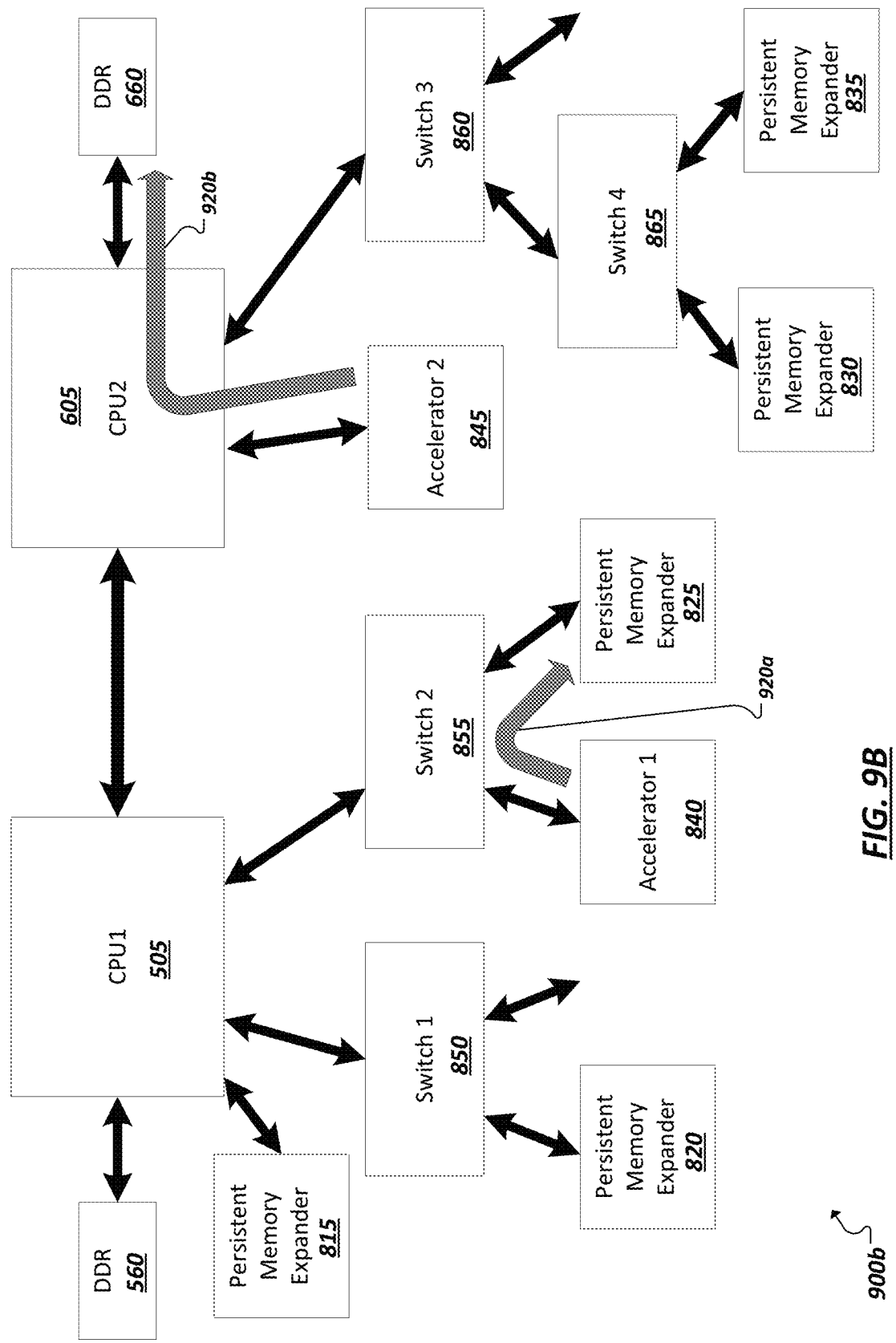

Turning to FIG. 9B, in this particular example, accelerator devices (e.g., 840, 845) connected within a CXL tree may receive a GPF cache flush request message (e.g., 915*e*, 915*g*) and, in response, cause data stored in its local cache to be flushed (or copied/written) to one or more persistent memory blocks in the system. For instance, accelerator device 840 may flush 920*a* its cache to persistent memory device 825 and accelerator device 845 may flush 920*b* its cache to CPU memory 660 based on receiving GPF cache flush request messages 915*e*, 915*g*. It should be appreciated that devices other than accelerators may be connected within a CXL tree and maintain cache or other volatile memory utilized by applications running on the system, which may be flushed in response to receiving a GPF request (e.g., 915a-k). Likewise, cache data may be flushed to one or more different persistent memory blocks (potentially hosted on multiple different memory devices (e.g., 560, 660, 815, 820, 825, 830, 835) within the system, among other example implementations.

Figure 9C:
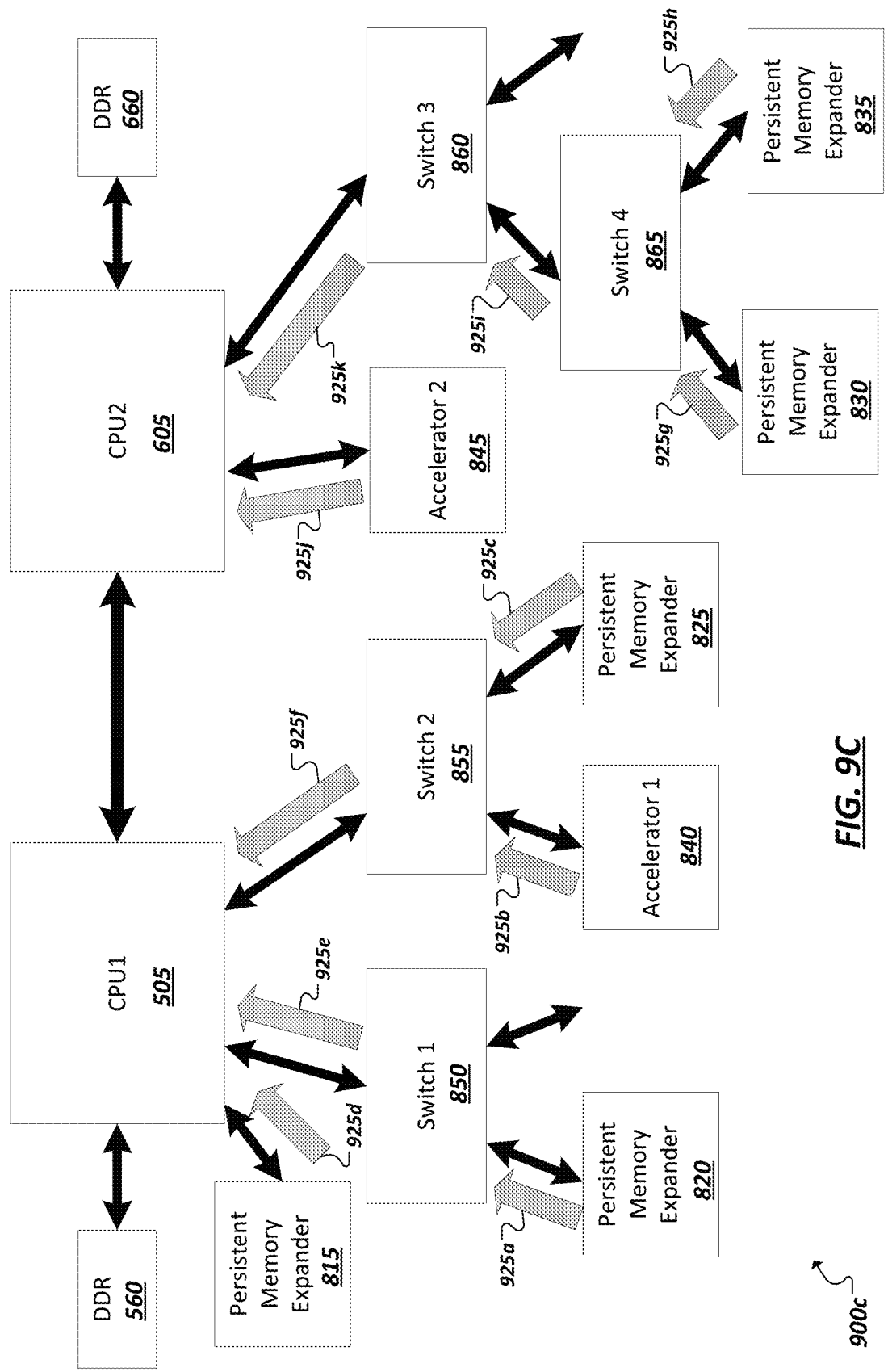

Continuing with the example of FIGS. 9A-9E, as illustrated in FIG. 9C, a GPF flow may be defined such that a device, upon receiving a GPF request (e.g., 915a-k), processes the response, acknowledges the received request (e.g., after processing), and reports the actions taken and any errors relating to these actions in corresponding GPF response messages. For instance, each receiving CXL device (e.g., 815, 820, 825, 830, 835, 840, 845, 850, 855, 860, 865), in order to comply with the defined GPF flow, may be expected to return a respective GPF cache flush response message (e.g., 925a-k) in response to receiving (and processing) a GPF cache flush request message. A flush response message may indicate whether the device completed its cache flush task(s) and/or whether an error occurred during its attempt to flush its cache to persistent memory. For devices, which have no cache to flush or no data in its cache, the response may simply indicate in its cache flush response (e.g., 925a-k) that it completed its flush task successfully In the case of switches, routers, or other devices, which direct messages from an upstream device (e.g., a host processor) to two or more connected downstream devices, flush responses may indicate the status, contents, and/or attributes of the aggregate flush responses received from their connected downstream devices. As an example, switch 855 may be used to route messages between CPU 505 and both accelerator 840 and persistent memory device 825. The switch 855 may receive GPF cache flush response messages 925b,c from each of the devices 825, 840. The cache flush response 925f generated by the switch 855 may be based on the responses 925b,c from devices 825, 840 and indicate whether these devices successfully completed their respective cache flush tasks and/or whether an error occurred. The host processor (e.g., 505) may thereby receive flush response messages (e.g., 925d-f), which indicate the success and/or errors of the cache flush phase for each of the devices (e.g., 815, 820, 825, 840, 850, 855) in its CXL tree. The host processor in command of the tree may log the results of the cache flush phase of the GPF flow and any errors that are detected and reported, either by the host processor (e.g., 505) or other downstream devices in the tree.

Given that time is often of the essence in connection with flushing volatile memory to persistent memory in connection with an event, timeout events may be defined, such that devices in a CXL tree are expected to generate a corresponding GPF flush response within a defined time window. If a response is not generated within this window, a timeout error may be identified (e.g., by the device that is to receive the response from its connected downstream device). In cases where a switch (e.g., 850) is awaiting a flush response from a given connected device (e.g., 820), but no flush response message is received, the switch may determine that a timeout has occurred and flag the timeout as an error reported in the flush response message (e.g., 925e) sent by the switch (e.g., 850). Similarly, other types of errors may be similarly indicated in flush responses, such that the indication of any error is passed up the tree from the detecting device to the host processor in command of the tree for logging.

Figure 9D:
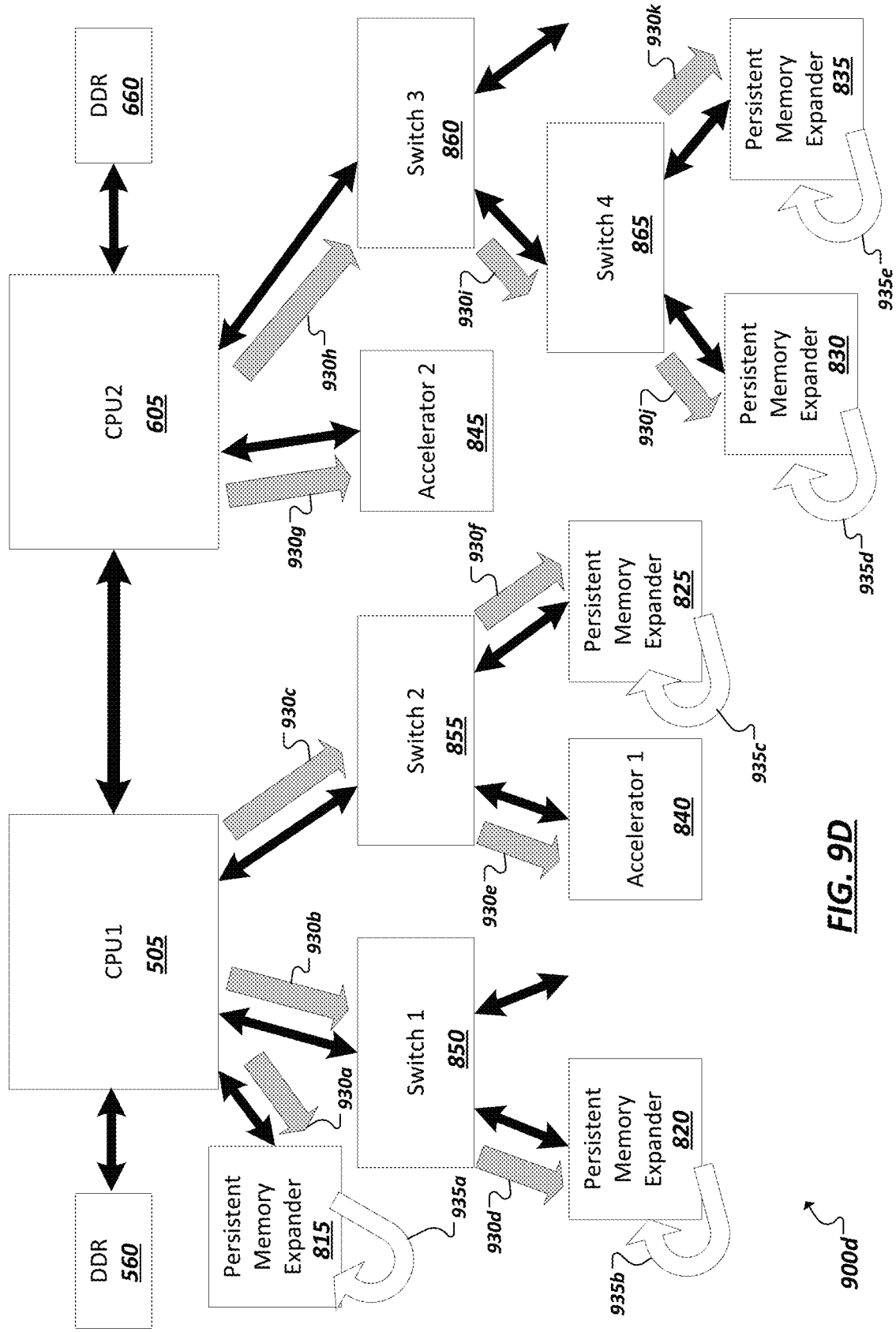

Once the host processor (e.g., 505, 605) of a tree receives cache flush responses from each of the CXL devices to which it is directly connected (e.g., devices 815, 850, 855 for CPU 505 and devices 845, 860 for CPU 605), the host processor may conclude that the cache flush phase of the GPF flow is complete. Upon conclusion of the cache flush phase, the host processor (e.g., 505, 605) may then initiate the next phase, the buffer flush phase, to cause the buffers of any persistent memory elements (to which cache data was just flushed) are themselves flushed to ensure all data sent to the persistent memory devices is in fact committed to persistent memory. In some implementations, persistent memory devices (e.g., 815, 820, 825, 830, 835, etc.) may include buffers to enable the devices to accept a higher bandwidth of inbound memory requests. Such buffers, however, may not be safe from events which trigger a GPF flow, making it desirable for the contents of these buffers to also be committed to persistent memory in response to a GPF event. Accordingly, as shown in FIG. 9D, during a buffer flush phase, each host processor (e.g., 505, 605) over a tree may send GPF buffer flush request messages (e.g., 930a-c, g, h) to its connected devices (e.g., 815, 845, 850, 855, 860) to initiate the buffer flush phase. As in the cache flush phase, buffer flush requests may cascade through the tree, with devices (e.g., 850, 855, 860, 865) generating corresponding instances of the buffer flush request to send to other downstream devices (e.g., 820, 825, 830, 835, 840, etc.), where applicable, to communicate the buffer flush request to all devices (and corresponding CXL protocol agents) within the tree. Upon receipt of a buffer flush request, persistent memory devices (e.g., 815, 820, 825, 830, 835) may react by flushing (e.g., 935a-e) to corresponding persistent memory.

In some implementations, a host processor (e.g., 505, 605) may leverage the second, buffer flush phase in a GPF flow to communicate cache flush errors reported to the host processor in the preceding cache flush phase. For instance, the host processor may insert information in buffer flush request messages (which are also included in corresponding buffer flush requests forwarded down the tree by switches, routers, and other intermediate devices) to indicate that one or more errors were identified and reported during the cache flush phase. Downstream devices (e.g., accelerators) receiving this information may log that an error occurred so that the device (and related software) are able to identify and handle the possibility that data scheduled for use by the device or software may be incomplete, or "dirty," in spite of the attempted cache flush.

Figure 9E:
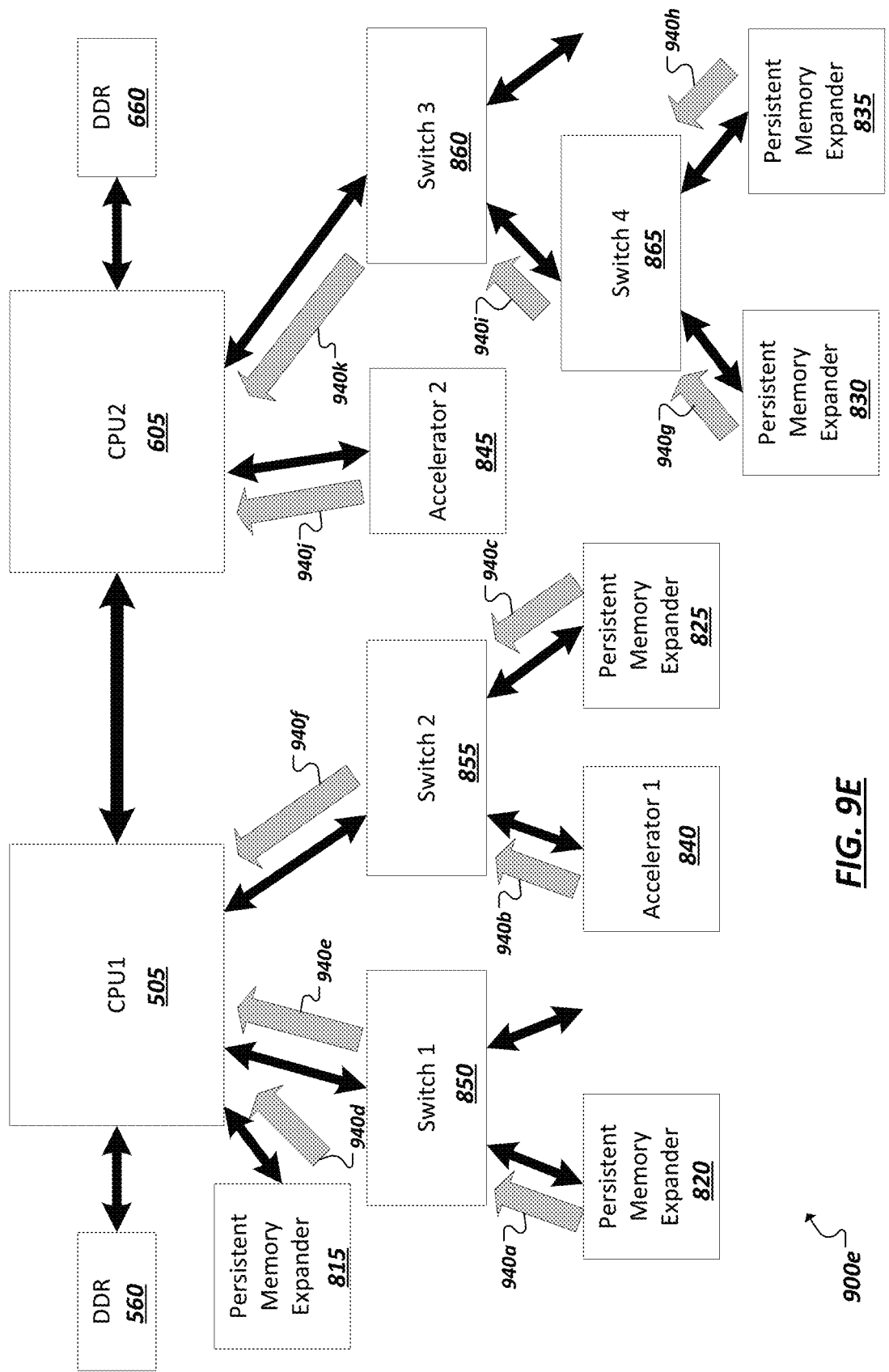

Continuing with the preceding example, as shown in FIG. 9E, as in the cache flush phase, each device may be expected to generate a respective buffer flush response (e.g., 940a-k) responsive to a corresponding buffer flush request. Each buffer flush response may also indicate whether the device's buffer flush actions were completed successfully or with errors. Devices for which a buffer flush is not applicable may simply respond that their buffer flush actions (or non-action) was successful. Upon receiving responses for each of the connected devices, corresponding host processors governing the CXL tree may determine that the GPF flow is complete and log any errors, which may have been reported in the buffer flush responses (e.g., 940a-k). This log data may be utilized by system software (e.g., on reboot) to fix and/or flag any issues and data, which may have been corrupted or may be dirty following the event (e.g., shutdown), which triggered the GPF flow.

Figure 10:
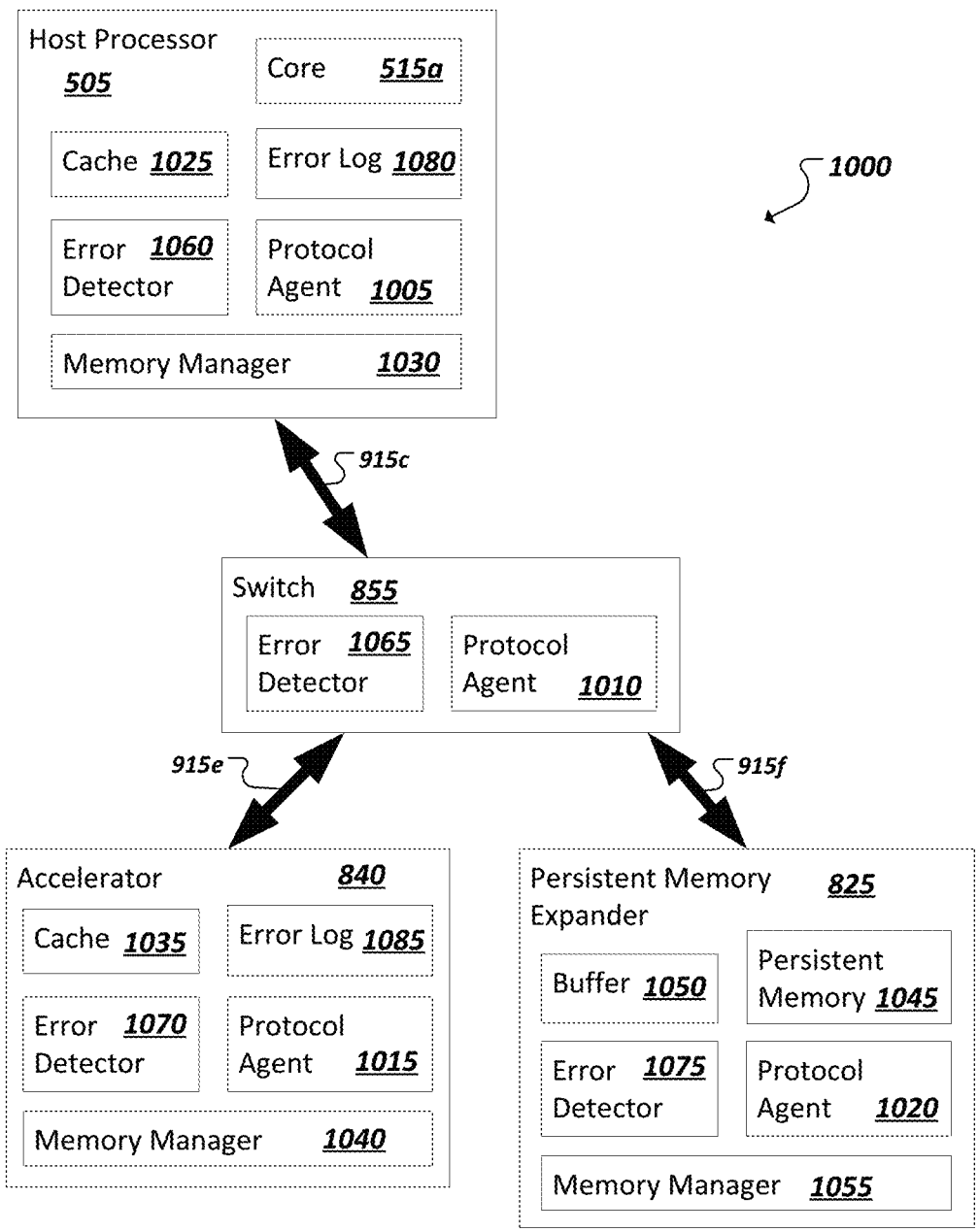
FIG. 10 is a simplified block diagram illustrating example devices in a computing system supporting a persistent memory flush flow.

FIG. 10 is a simplified block diagram 1000 illustrating example component devices (e.g., 505, 825, 840, 855) within an example system. In this example, respective CXL links (e.g., 915c, 915e, 915f) may be utilized to interconnect the devices, including a host processor 505 and an accelerator 840 and persistent memory expander device 825 communicating with the host processor 505 over a protocol-aware (e.g., CXL compliant) switch 855. In one example, each of the CXL devices (e.g., 505, 825, 840, 855) may include protocol agent logic (e.g., 1005, 1010, 1015, 1020) to implement at least a portion of one or more layers of the CXL stack at one or more ports of the device and support the generation and processing of CXL request and response messages to be sent over the CXL links in a GPF flow. One or more of the devices, such as host processor (e.g., 505) and accelerator devices (e.g., 840), may include local (volatile) memory to implement a cache (e.g., 1025, 1035) and a respective memory manager (e.g., 1030, 1040) to manage the data in the cache including performing flushes of cache data to persistent memory (e.g., 1045 of persistent memory device 825). In the case of a persistent memory device (e.g., 825) one or more buffers (e.g., 1050) may be implemented and also managed (e.g., flushes orchestrated) using a corresponding memory manager (e.g., 1040). In some implementations, devices (e.g., 505, 825, 840, 855) in a CXL tree may also be equipped with error detection circuitry (e.g., 1060, 1065, 1070, 1075) to identify that a particular GPF task was not performed or completed correctly at the device (e.g., a cache or buffer flush or writing of flushed data to persistent memory) or determine an error based on a response (or non-response) from another device. One or more devices (e.g., 505, 840), which may be called upon to execute instructions utilizing data, which may be subject to a GPF procedure, may also include error logs (e.g., 1080, 1085) to identify an instance where dirty data may be present in a system based on errors detected and reported during a prior GPF flow. The error logs (e.g., 1080, 1085) may be used to protect against such dirty data from being used at the device and to assist system software or other system tools in remediating the error(s), among other example features and components.

Figure 11:
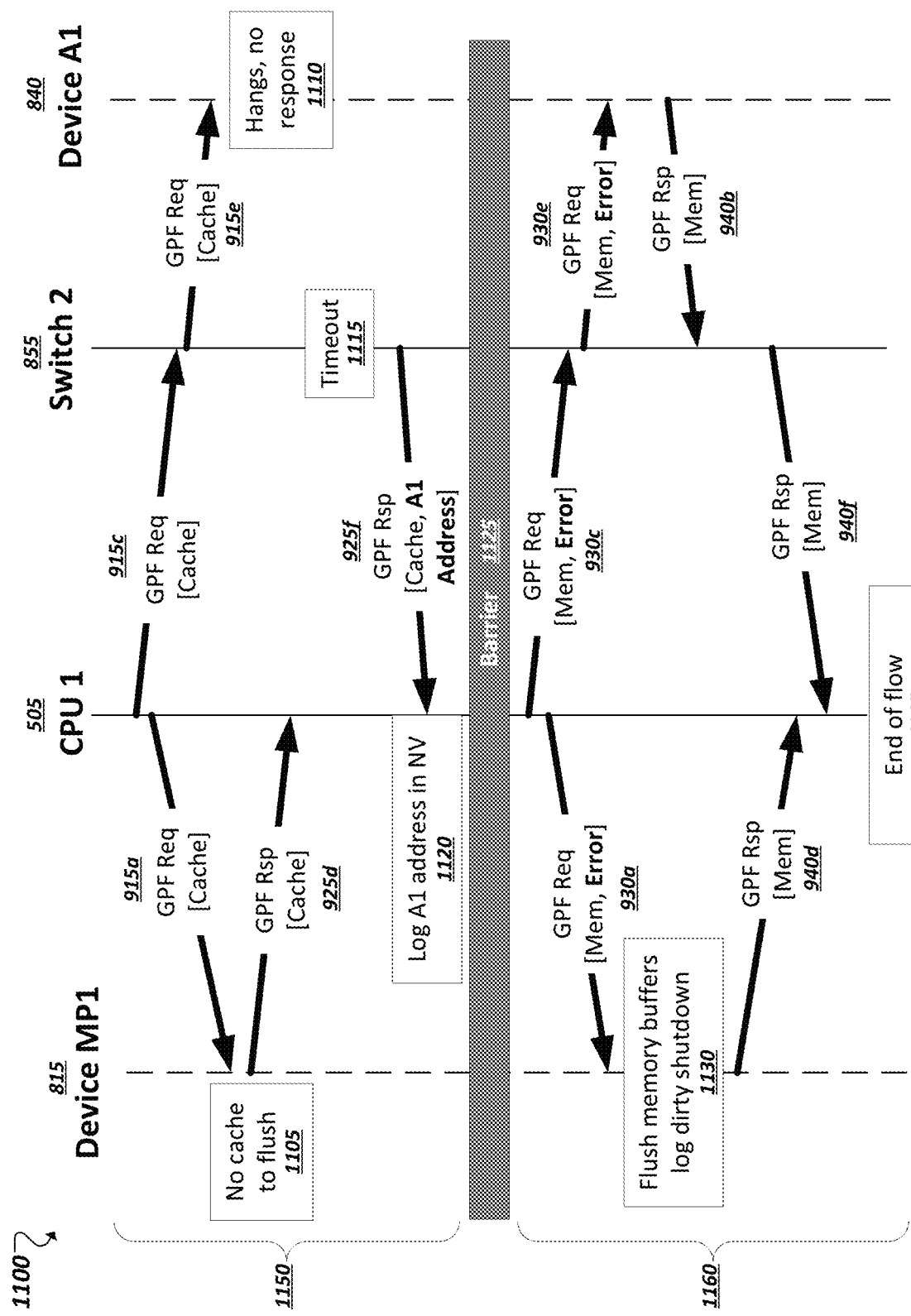
FIG. 11 is a flow diagram illustrating a persistent memory flush flow.

FIG. 11 is a flow diagram 100 illustrating an example GPF involving a portion of devices within an example CXL tree. In a cache flush phase, a host processor (e.g., CPU 505) sends GPF request messages (e.g., 915a, 915c) to a persistent memory device 815 and switch device 855 connected to the CPU 805. In some implementations, a GPF request message can be based on a general I/O message format (e.g., a CXL.io message packet format) that may be reused for other messages and message types (e.g., non-GPF messages). For instance, values in one or more fields of the message format may be set to indicate that the message is a GPF message and one or more additional fields may be set to indicate that the message is cache flush request message within the GPF flow. In this example, switch 855 receives the cache flush request message 915c and generates a corresponding instance 915e of the flush request message to send to other devices attached to the switch 855, such as accelerator device 840. Further, when persistent memory device 815 receives the cache flush request 915a it takes no action (at 1105) as the device 815 has no cache to flush and sends a response message 925d to CPU 505 to indicate that it successfully performed its part of the GPF cache flush phase.

Continuing with the example of FIG. 11, the accelerator device 840 may hang (at 1110) while attempting to perform a flush of its cache or in generating a GPF response message (e.g., after actually succeeding to flush its cache to persistent memory). Accordingly, no response is sent to switch 855 from accelerator device 840 and timeout 1115 is detected at the switch 855. The switch may identify that an error has occurred based on the timeout and generate a cache flush response 925f that indicates the error and attributes of the error (e.g., an address of the device (e.g., 840) responsible for the error. As a switch may be connected to multiple downstream devices, it may receive multiple flush response messages. In some implementations, the flush response (e.g., 925f) sent by the switch may identify (in the single response message) each of multiple errors identified based on responses or non-responses received at the switch in response to a flush request. Alternatively, if no errors are detected at or reported to the switch (from its multiple connected downstream devices) the flush response (e.g., 925f) provided by the switch may indicate the aggregate success of each of the collection of devices downstream from the switch (e.g., in that no errors are reported in the switch's flush response message), among other examples. As with GPF request messages, GPF response messages may be likewise based on a base I/O message format and include fields to indicate that the message is a response to a cache flush request.

Continuing with the example of FIG. 11, the CPU 505, after initiating the cache flush phase 1150, may determine that either a cache flush response (e.g., 925d, 925f) has been received or a timeout occurred for each of the devices (e.g., 815, 855) connected (directly) to the CPU 505 by a corresponding CXL link. The CPU 505 may determine based on these responses (and non-responses) whether an error has occurred during the cache flush phase and generate one or more records (at 1120) describing the error(s) in a log (e.g., logging the address of the hung accelerator device 840 and associate it with an error during the cache flush phase).

The CPU 505 may enforce a logical barrier 1125, or division, between the cache flush phase 1150 and the subsequent memory, or buffer, flush phase 1160 by ensuring that responses or timeouts have been accounted for all devices connected to the CPU 505. Once the responses/non-responses have been accounted for, the CPU 505 may initiate the buffer flush phase 1160, by sending buffer flush request messages (e.g., 930a, 930c) to each of the devices (e.g., 815, 855) directly connected to the CPU 505. Upon receipt of the buffer flush request messages (e.g., 930a, 930c), the receiving device (e.g., 815, 855) may forward instances (e.g., 930c) of the buffer flush request to other downstream devices (e.g., 840) and/or perform a buffer flush (where applicable) in response to the request. For instance, for persistent memory devices (e.g., 815), which include a buffer, the memory buffers of the persistent memory device may be flushed (at 1130) to persistent memory and a corresponding buffer flush response (e.g., 94d) generated to indicate the status of the buffer flush (e.g., success or error). For other devices (e.g., without persistent memory or buffers), the device may generate a buffer flush response without taking any additional action. Further, as with the cache flush phase, a switch receiving multiple buffer flush responses may aggregate information from these multiple responses and generate a single buffer flush response (e.g., 940f) for the switch (e.g., 855) based on the aggregate information, among other examples.

In the particular example of FIG. 11, based on one or more errors being detected and reported to the CPU 505 in the cache flush phase 1150, the CPU may cause that buffer flush request messages indicate (e.g., in one or more particular fields of the buffer flush request) that the cache flush phase contained an error. Accordingly, in addition to performing buffer flushing in response to receipt of a buffer flush request message (e.g., 930a, 930c, 930e, etc.), a receiving device (e.g., 815) may also log a dirty shutdown event (e.g., at 1130) to indicate the possibility of dirty data resulting from the cache flush error, among other example actions. Errors may also be reported in connection with the buffer flush phase 1160 to indicate errors occurring during buffer flushes within this phase. Such errors may also be logged (e.g., by the CPU) and the corresponding log information may be assessed to correct or remediate related issues causing the errors. When responses (e.g., 940*d*, 940*f*), or alternatively timeouts, have been identified for each of the devices (e.g., 815, 855) connected to the CPU 505, the CPU 505 may end 1135 the GPF flow and enable further system action to be taken in connection with the event (e.g., shutdown) corresponding to the initiation of the GPF flow.

Figure 12A:
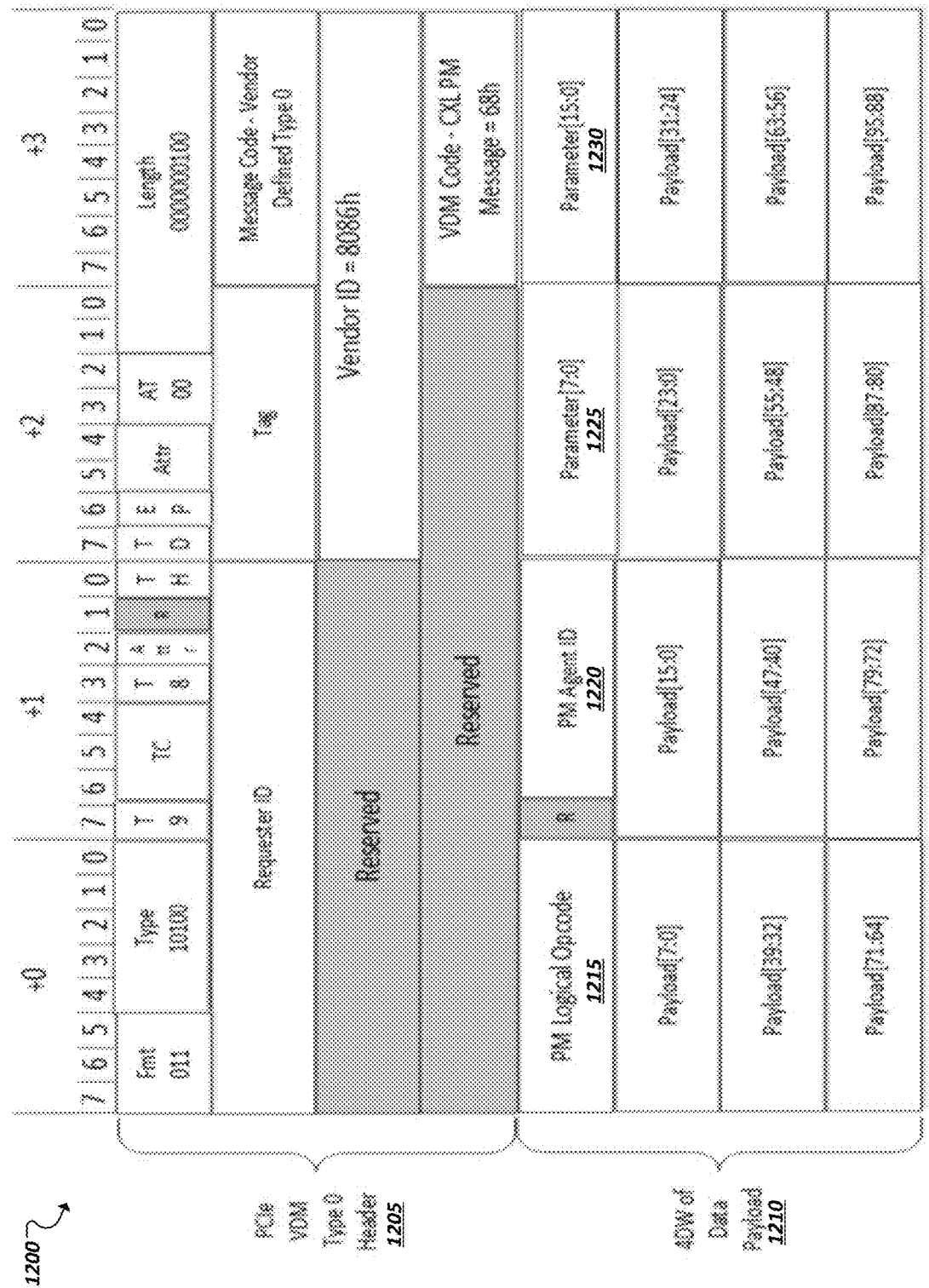

FIGS. 12A-12B show example formats for messages utilized in GPF flows, including GPF cache flush requests and responses and GPF buffer flush requests and responses. FIG. 12A shows an example packet format (e.g., a CXL.io packet format), which may be leveraged for use in GPF requests and responses. In one example, the packet format may correspond to or be based on a CXL power management message format. For instance, The CXL power management messages may be sent as PCIe Vendor Defined Type 0 messages with a 4 double words (DW) of data payload. Such messages may utilize Format and Type fields with values set to indicate message with data and routing of "Local Terminate at Receiver." The Message Code may be set to Vendor Defined Type 0 and Byte 15 of the message header may be contain a VDM Code and be set to a value to indicate that the message is a CXL power management (PM) message (e.g., "68h"). Further, the 4DW Data Payload of the message may contains the CXL PM Logical Opcode and any other information related to the CXL PM message.

As shown in FIG. 12A, an example CXL power management message packet 1200 is represented. The packet may include a header portion 1205 (e.g., 4 DW) and a data payload portion 1210. Message codes (e.g., 1215, 1220) in the header 1205 may be utilized to indicate that the packet is a CXL power management packet. Additional codes may be provided (e.g., in OpCode field 1215 and/or parameter fields 1225, 1230) to indicate whether the packet is GPF request or response packet within the cache flush or buffer flush phase of the GPF flow. Turning to FIG. 12B, a representation of the payload portion 1210 of the packet is shown, including field definitions for indicating that the packet is a GPF request or response packet, among other information. For instance, OpCode 1215 may be provided to identify that the packet pertains to a GPF flow. An agent identifier (ID) field 1220 may indicate the source of the packet (e.g., whether a request or response), for instance, by identifying a corresponding agent identifier. Parameter 1225 may be encoded with a value (e.g., of one or more bits) to indicate whether the packet is a request (e.g., originating from a host processor in a CXL tree) or a response (e.g., where Bit 0=1 indicates a flush request and Bit 0=0 indicates a flow response).

The length of the payload packet may be based on whether the packet is a request or response packet in the cache flush or buffer flush GPF phase. For instance, in the example of FIG. 12B, fields may be provided within the first double word (DW) 1230 of payload data to indicate whether additional extended payload fields (e.g., 1235, 1240, 1245, 1250) are utilized to identify error information in a corresponding particular flush response. In some implementations, such extended payload fields may not be utilized in flush requests. Additional fields (e.g., in Payload bits [17:16]) may identify whether the request or response is within the cache flush or the memory buffer flush phase. In buffer flush requests, the packet may include data to indicate whether any errors were reported to the host during the preceding cache flush phase. For instance, Payload bit [9] may be utilized in buffer flush requests to indicate (in a binary manner) whether or not any errors were identified in the cache flush phase.

In flush responses, errors may be identified using one or more fields of the message packet. For instance, Payload bits [27:24] (in the first payload DW 1230) may be utilized to indicate which, if any, extended payload fields (e.g., 1235, 1240, 1245, 1250) contain error information. For instance, each extended payload field may map to one of the bits in Payload bits [27:24] and may identify the source of the error (e.g., naming the address of the responsible component), among other example information. This may allow for up to four distinct errors to be described within a single flush response message. For instance, a switch may identify two errors involving two other devices and may encode Payload bits [27:24]="0011b" to indicate that extended payload field 1235 (corresponding to the first error) and extended payload field 1240 (corresponding to the second error) are encoded with error information. If none of the extended payload fields are used because no errors are being reported (e.g., as indicated when Payload bits [27:24]="0h"), the flush response message may be interpreted (by the receiving element) to indicate successful performance of related flush activities and the reporting of no errors, among other example implementations, fields, and encodings.

It should be appreciated that the example embodiments and illustrations herein are provided for convenience in illustrating, by example, more generalized principles, which may be equally applied to different system architectures and topologies and different interconnect technologies and protocols. For instance, different message formats and fields may be utilized to realize messaging within a GPF flow. Similarly, protocols and technologies other than CXL may also utilize GPF to extend flushing of data in volatile memory (including data outside the host) to persistent memory (e.g., including persistent memory blocks hosted in discrete memory extender devices), among other examples.

Figure 13A:
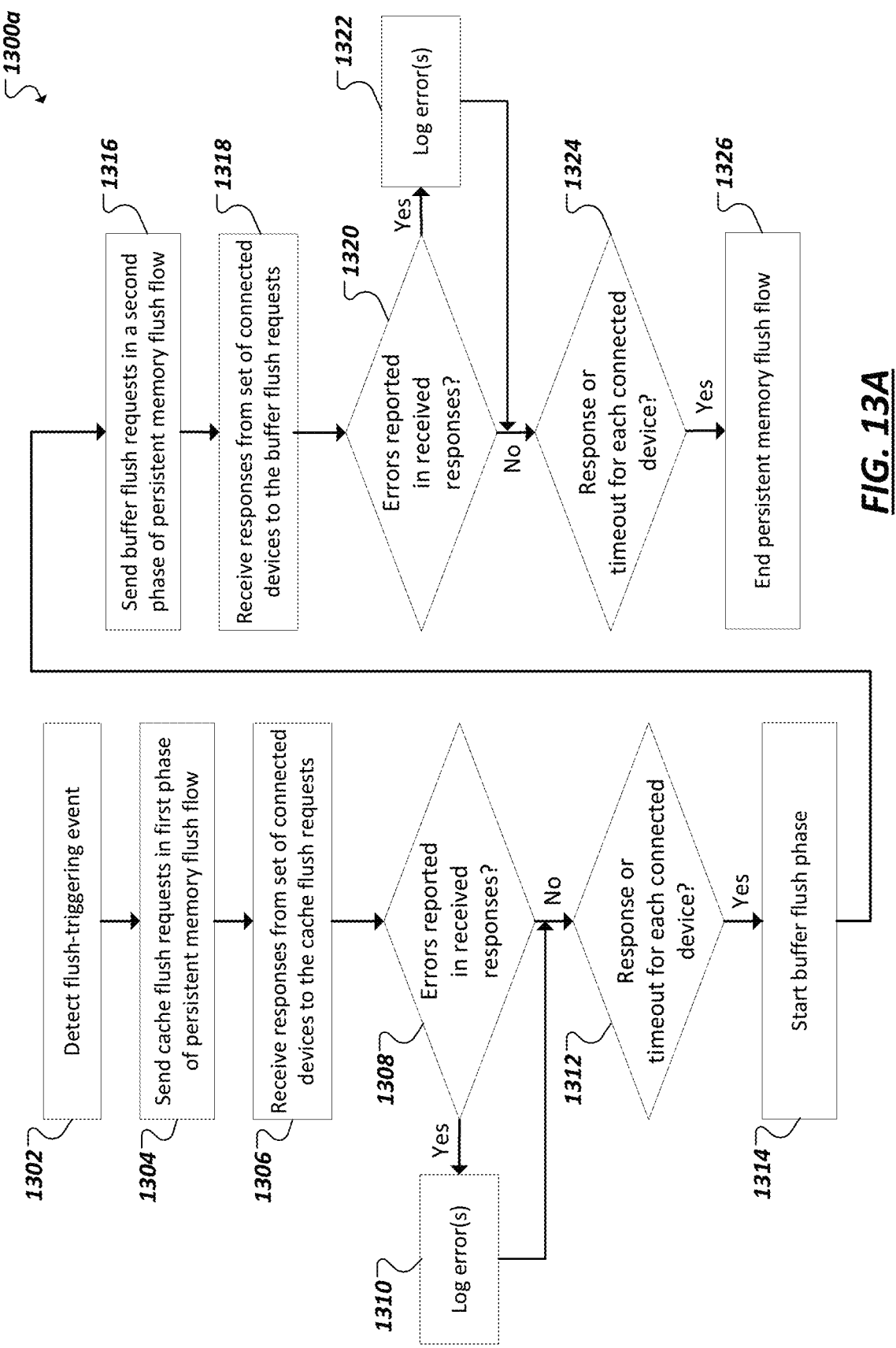
FIGS. 13A-13B are flowcharts illustrating example techniques to implement an example persistent memory flush flow.
Figure 13B:
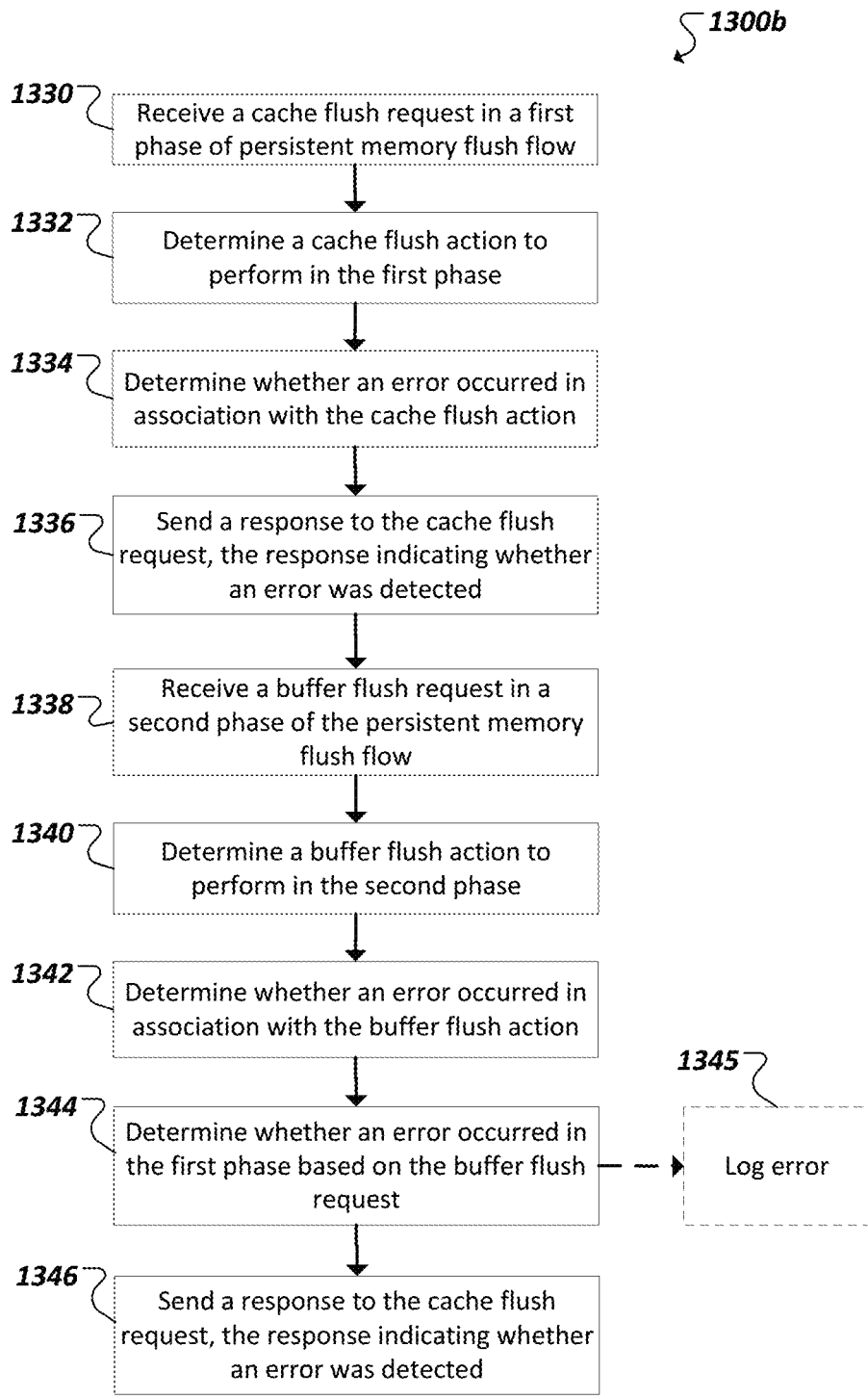

FIGS. 13A-13B are flowcharts 1300*a-b* illustrating example techniques in performing a persistent memory flush is a computing system. For instance, in the example of FIG. 13A, a host processor connected to a set of devices (e.g., including switch devices or other devices, which themselves, may be connected to further devices downstream from the host processor) may detect 1302 a flush-triggering event (e.g., an abnormal shutdown, power failure, fatal system error, etc.) and initiate a persistent memory flush flow in response to guard against the loss of data, which has not yet been committed to persistent memory of the system at the time of the event. Devices downstream from the host processor may include memory devices, which provide persistent memory within the system (e.g., to accelerators or other devices). To initiate the persistent memory flush flow, the host processor may send cache flush requests to the set of devices (e.g., by sending flush requests to those devices immediately connected, point-to-point to the host processor by a link, these devices forwarding the requests to any other devices further downstream from the host processor and not directly connected to the host processor by a point-to-point link). The host processor may then receive responses to the cache flush requests within a first phase of the persistent memory flush flow. If errors have occurred during devices' attempts to flush their cache to persistent memory or based on a device's failure to submit a response to the cache flow request, they may be reported in the cache flush responses. If errors have been reported (at 1308), these may be logged

1310 at the host processor. Further, the host processor may assess (at 1312) whether responses (or timeout events) have been identified for each of the devices in the set of devices. When all responses or non-responses have been accounted for, the host processor may conclude the first phase of the persistent memory flush flow (e.g., CXL GPF flow) and initiate a second phase of the persistent memory flush flow to flush memory buffers of devices hosting persistent memory.

Continuing with the example of FIG. 13A, the second phase may begin with the host processor sending buffer flush requests to the set of devices to prompt buffers of persistent memory devices to flush their buffers to persistent memory. Responses may be received 1318 from the set of devices to the buffer flush requests, and the host processor may again assess (at 1320) whether any errors are reported in the buffer flush responses (e.g., based on errors occurring during the buffer flushes or the second phase generally) and log 1322 any such errors. The host processor may also determine 1324 whether responses (or timeouts) to the buffer flush requests have been delivered/determined for each of the set of devices and conclude the persistent memory flush flow when all devices are accounted for, among other example implementations.

Turning to FIG. 13B, in one example, a particular device may be communicatively connected to a host processor device through a hierarchy, or tree, of devices. For instance, the host processor may initiate a persistent memory flush flow and initiate the sending of cache flush requests, such as in the example of FIG. 13A. The particular device (e.g., a memory device, accelerator, switch, etc.) may receive 1330 a cache flush request in a first phase of the persistent memory flush flow (either directly from the host processor or as forwarded from another device (e.g., a switch) situated between the particular device and the host processor). The particular device may determine 1332 a cache flush action to perform in the first phase. In instances where the particular device does not have cache memory to flush or no data in its cache to flush, the particular device may determine 1332 that no action is needed. In other cases, the particular device may determine that a cache flush should be performed by the particular device, among other examples. The particular device may additionally determine 1334 whether an error occurred in association with the cache flush (e.g., either by the particular device itself or by another device (e.g., the persistent memory device), among other examples. The particular device sends 1336 a response to the cache flush request to be routed back to the host processor device, the response indicating whether an error was detected in association with cache flush actions or responses in the first phase of the persistent memory flush flow.

The host processor may initiate a second phase of the persistent memory flush flow by sending buffer flush requests to the devices, an instance of the buffer flush request also be directed to and received 1338 by the particular device. As with the cache flush request processing, the particular device may determine 1340 whether and what buffer flush actions to perform in the second phase based on the buffer flush request. For instance, in cases where the particular device host persistent memory and has a memory buffer, the particular device attempts to flush the memory buffer to the persistent memory based on receipt of the buffer flush request. In other instances, the particular device may have neither persistent memory nor a buffer to flush and may take no action responsive to the buffer flush request outside of the buffer flush response (at 1346). The particular device may additionally determine 1342 whether any errors occurred during the second phase and generate a response to the buffer flush request to be sent 1346 and routed back to the host processor. The response to the buffer flush request may additionally identify any errors identified in the second phase. In some implementations, a buffer flush request may be encoded with information to identify to the devices whether any errors were reported in connection with the first cache flush phase. Accordingly, the particular device may determine 1344 whether an error was reported in the first phase based on the buffer flush request and may optionally log 1345 the error, for instance, to identify the possibility of dirty data based on the reported cache flush error, among other example features and implementations.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 14:
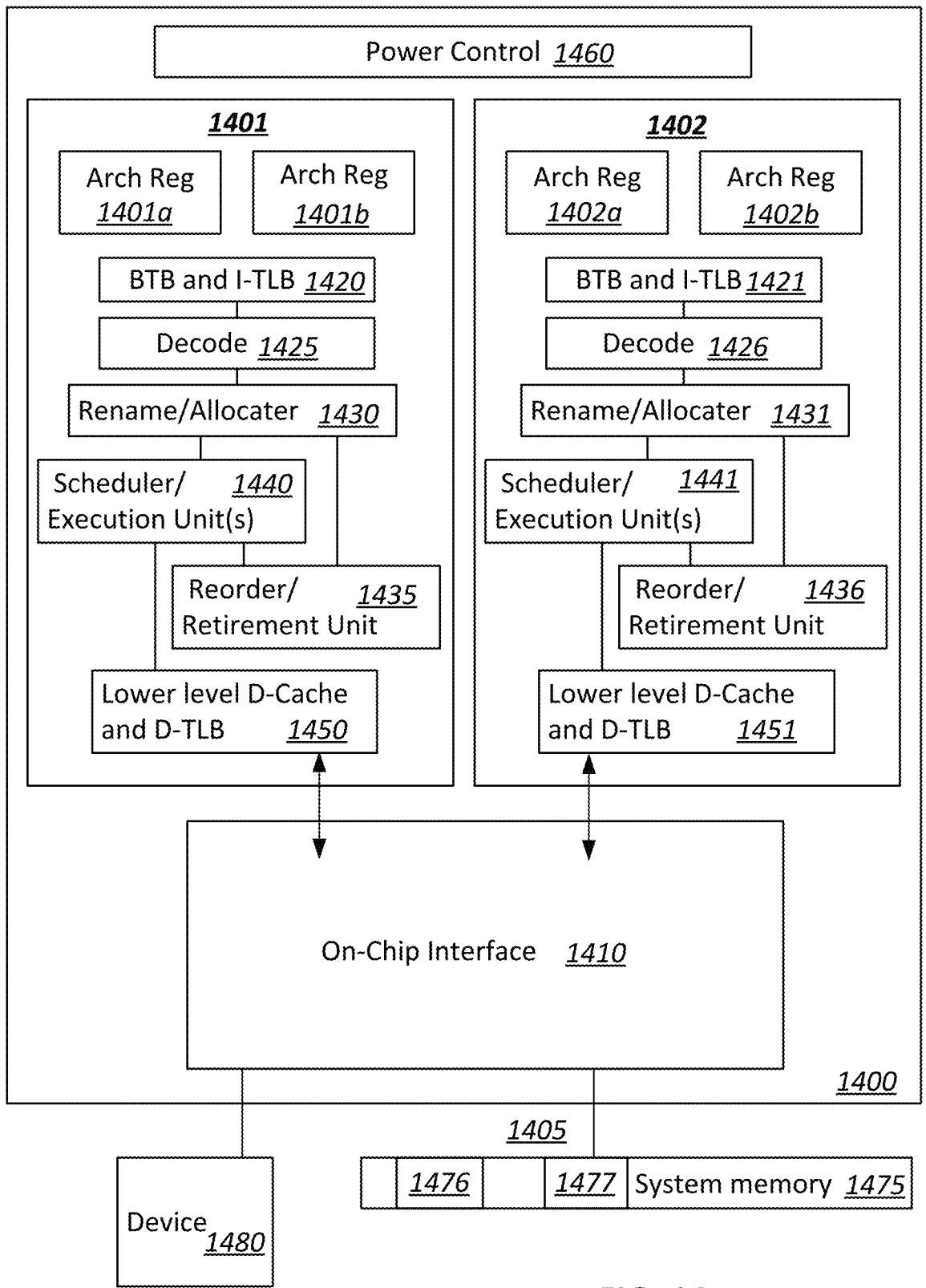
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores-core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores—core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (1401a, 1401b, 1402a, and 1402b) may be referred to as processing elements, thread slots, or thread units, as described above. As illustrated, architecture state registers 1401a are replicated in architecture state registers 1401b, so individual architecture states/contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401a, 1401b, respectively. Usually core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401a and 1401b are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example, in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
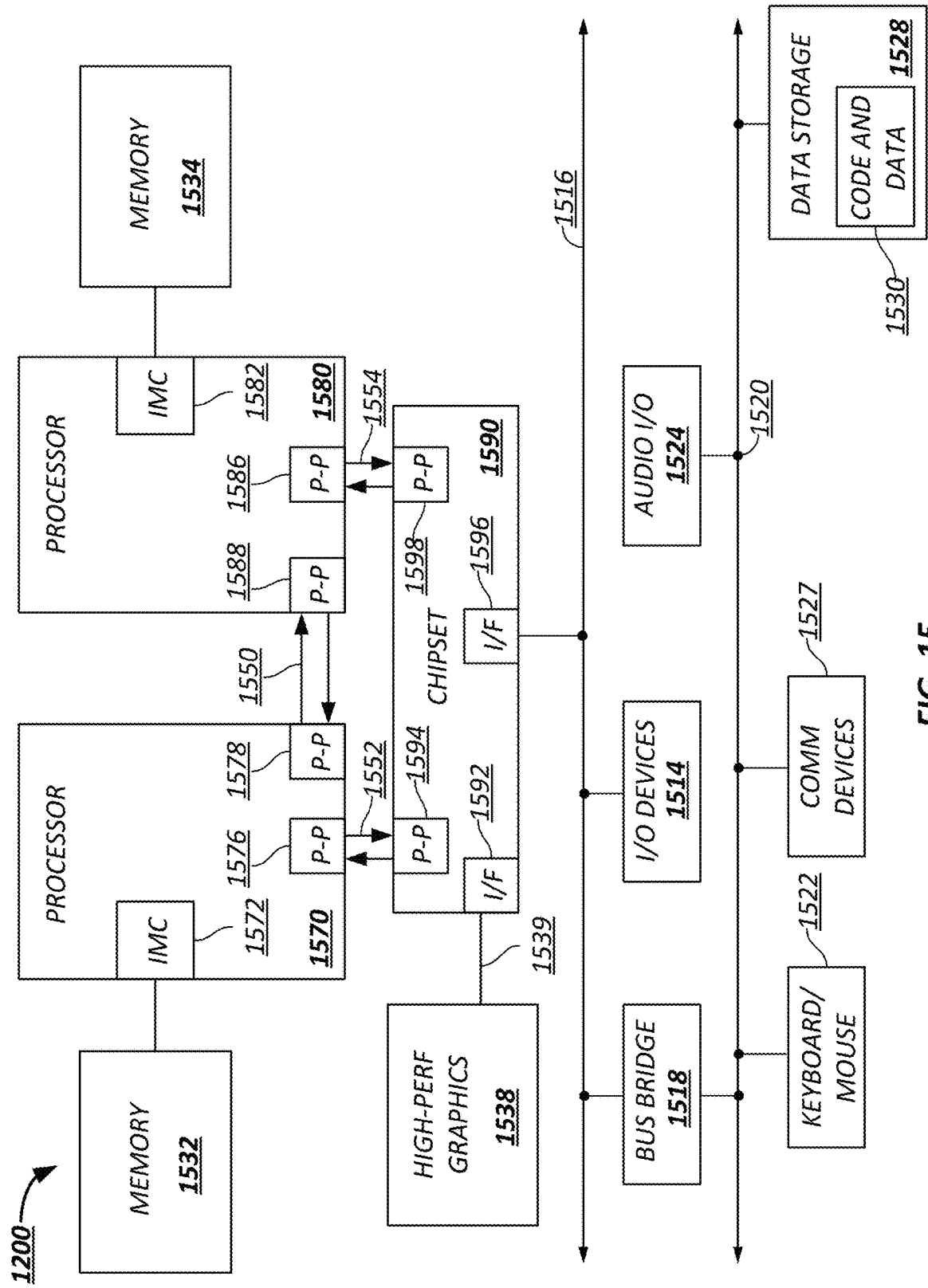
FIG. 15 illustrates another embodiment of a block diagram for a computing system.

Referring now to FIG. 15, shown is a block diagram of a second system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as Intel's Quick Path Interconnect (QPI) architecture. As a result, the invention may be implemented within the QPI architecture.

While shown with only two processors 1570, 1580, it is to be understood that the scope of the present invention is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

A processor, in one embodiment, includes a microprocessor, multi-core processor, multithreaded processor, an ultra-low voltage processor, an embedded processor, or other known processing element. In the illustrated implementation, processor acts as a main processing unit and central hub for communication with many of the various components of the system. As one example, processor is implemented as a system on a chip (SoC). As a specific illustrative example, processor includes an Intel® Architecture Core™—based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

Processor, in one embodiment, communicates with a system memory. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via an SSD. However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by an SSD alone or as a disk, optical or other drive with an SSD cache. In some embodiments, the mass storage is implemented as an SSD or as an HDD along with a restore (RST) cache module. In various implementations, the HDD provides for storage of between 320 GB-4 terabytes (TB) and upward while the RST cache is implemented with an SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various peripheral devices may couple to processor via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.,) portable device such as a smartphone of the user via adapting the two devices together in close relation and enabling transfer of information such as identification information payment information, data such as image data or so forth. Wireless power transfer may also be performed using an NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short-range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or I²C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition, NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high-resolution camera, e.g., having a resolution of at least 2.0 megapixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is an apparatus including: a port; and protocol circuitry to: identify a first request received at the port in a persistent memory flush, where the first request requests that data in cache memory in a system be flushed to persistent memory in the system, the persistent memory flush is initiated by a host processor device, and the first request is received in a first phase of the persistent memory flush; send a first response to the first request, where the first response is to be routed to the host processor device and is sent in the first phase of the persistent memory flush; identify a second request in the persistent memory flush, where the second request requests that buffers associated with persistent memory in the system be flushed to persistent memory, and the second request is received in a second phase of the persistent memory flush; and send a second response to the second request, where the second response is to be routed to the host processor device and is sent in the second phase of the persistent memory flush.

Example 2 includes the subject matter of example 1, further including: particular persistent memory; a particular buffer; and a memory manager to: write data from a particular cache of another device in the system into the particular persistent memory based on the first request; and write data from the particular buffer into the non-volatile memory based on the second request.

Example 3 includes the subject matter of example 1, further including: processor circuitry; a particular cache associated with the processor circuitry; and a memory manager to cause data in the particular cache to be written to persistent memory on another device in the system based on the first request.

Example 4 includes the subject matter of example 3, where the apparatus includes a hardware accelerator device.

Example 5 includes the subject matter of example 1, where the apparatus includes a switch, the switch is connected to a first downstream device and a second downstream device, and the switch is to: forward respective instances of the first request to the first and second downstream devices; receive respective responses to the first request from the first and second downstream devices, where the first response is based on information in the responses to the first request from the first and second downstream devices; forward respective instances of the second request to the first and second downstream devices; and receive respective responses to the second request from the first and second downstream devices, where the second response is based on information in the responses to the second request from the first and second downstream devices.

Example 6 includes the subject matter of any one of examples 1-5, further including: error detection circuitry to identify an error in the first phase or the second phase of the persistent memory flush; where the first response identifies whether an error is detected in the first phase and the second response identifies whether an error is detected in the second phase.

Example 7 includes the subject matter of example 6, where the first response includes a field to indicate that a particular error is detected in the first phase and the first response further includes a payload field to indicate attributes of the particular error.

Example 8 includes the subject matter of example 7, where the payload field includes one of a plurality of payload fields, and the field identifies which of the plurality of payload fields are populated with information to describe the particular error.

Example 9 includes the subject matter of any one of examples 7-8, where the attributes include an address of a source of the particular error.

Example 10 includes the subject matter of any one of examples 7-9, where the second response also includes the field and the payload field.

Example 11 includes the subject matter of any one of examples 1-10, where the second request includes a field to indicate whether an error was detected in the system in the first phase of the persistent memory flush.

Example 12 includes the subject matter of example 11, further including logging circuitry to log the error based on the field in the second request.

Example 13 includes the subject matter of any one of examples 1-12, where the port couples the apparatus to a second apparatus via a link, the link is compliant with a particular interconnect protocol, and the first request, first response, second request, and second response are based on the particular interconnect protocol.

Example 14 includes the subject matter of example 13, where the particular interconnect protocol includes Compute Express Link (CXL).

Example 15 is a method including: receiving a cache flush request in a first phase of a persistent memory flush flow, where the first phase is initiated by a host processor, and the cache flush request requests that data in cache memory be flushed to persistent memory within a system; determining whether an error occurs in the first phase; sending a cache flush response in the first phase, where the cache flush response identifies whether an error is detected in the first phase; receiving a memory buffer flush request in a second phase of the persistent memory flush flow, where the second phase is initiated by the host processor upon completion of the first phase, and the memory buffer flush request requests that data in buffers of persistent memory devices in the system be flushed to persistent memory; and sending a memory buffer flush response in the second phase.

Example 16 includes the subject matter of example 15, where at least a portion of the cache memory in the system resides in an accelerator device separate from the host processor, and at least a portion of the persistent memory in the system resides in memory extension devices.

Example 17 includes the subject matter of any one of examples 15-16, where the cache flush response includes a field to indicate that a particular error is detected in the first phase.

Example 18 includes the subject matter of example 17, where the cache flush response further includes a payload field to indicate attributes of the particular error.

Example 19 includes the subject matter of example 18, where the payload field includes one of a plurality of payload fields, and the field identifies which of the plurality of payload fields are populated with information to describe the particular error.

Example 20 includes the subject matter of any one of examples 18-19, where the attributes include an address of a source of the particular error.

Example 21 includes the subject matter of any one of examples 18-20, where the second response also includes the field and the payload field.

Example 22 includes the subject matter of any one of examples 15-21, where the memory buffer flush request includes a field to indicate whether an error was detected in the system in the first phase of the persistent memory flush flow.

Example 23 includes the subject matter of example 22, further including logging the error based on the field in the second request.

Example 24 includes the subject matter of any one of examples 15-23, where the first request, first response, second request, and second response are based on a particular interconnect protocol.

Example 25 includes the subject matter of example 24, where the particular interconnect protocol includes Compute Express Link (CXL).

Example 26 is a system including means to perform the method of any one of examples 15-25.

Example 27 includes the subject matter of example 26, where the means include circuitry of a switch device Example 28 includes the subject matter of example 26, where the means include circuitry of an accelerator device Example 29 includes the subject matter of example 26, where the means include circuitry of a persistent memory device.

Example 30 includes the subject matter of example 26, where the means include a non-transitory storage medium with instructions thereon, the instruction executable by a machine to perform at least a portion of the method of any one of examples 15-25.

Example 31 is a system including: a host processor device including: one or more cores; host memory; and protocol circuitry to: send instances of a cache flush request to a set of devices connected to the host processor device, where the cache flush request corresponds to a start of a first phase of a persistent memory flush flow and requests that data in cache memory in the set of devices be flushed to persistent memory, where the persistent memory includes a memory device external to the host memory; receive a first set of responses to the cache flush request from the set of devices; determine completion of the first phase based on the first set of responses; send instances of a memory buffer flush request to the set of devices, where the memory buffer flush request corresponds to a start of a second phase of the persistent memory flush flow and requests that a buffer of the memory device be flushed to the persistent memory; and receive a second set of responses to the memory buffer flush request from the set of devices.

Example 32 includes the subject matter of example 31, where the first set of responses identifies an error detected during the first phase by another device, and the memory buffer flush request identifies the error.

Example 33 includes the subject matter of example 32, further including an error log to identify the error, where the error log is accessible to system software.

Example 34 includes the subject matter of example 33, where the host processor includes a first processor and the system further includes a second processor coupled to the first processor by a link, the set of devices includes a first set of devices, and the second processor is connected to a second set of devices, where the second processor coordinates with the first processor to manage the first and second phases of the persistent memory flush flow for the second set of devices.

Example 35 includes the subject matter of any one of examples 31-34, where the host processor further includes hardware logic to identify an event and the persistent memory flush flow is initiated by the host processor based on the event.

Example 36 includes the subject matter of any one of examples 31-35, further including the set of devices, where the set of devices includes a switch device, an accelerator device, or a persistent memory device.

Example 37 includes the subject matter of any one of examples 31-36, where the set of devices includes the apparatus of any one of examples 1-14

Example 38 includes the subject matter of any one of examples 31-37, where the host processor is connected to each of the set of devices by a respective link, and each of the links connecting the host processor to the set of devices is compliant with Compute Express Link (CXL)-based protocol.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a port; and
protocol circuitry to:
identify a first request received at the port in a persistent memory flush, wherein the first request requests that data in cache memory in a system be flushed to persistent memory in the system, the persistent memory flush is initiated by a host processor device, and the first request is received in a first phase of the persistent memory flush;
send a first response to the first request, wherein the first response is to be routed to the host processor device and is sent in the first phase of the persistent memory flush;
identify a second request in the persistent memory flush, wherein the second request requests that buffers associated with persistent memory in the system be flushed to persistent memory, and the second request is received in a second phase of the persistent memory flush; and
send a second response to the second request, wherein the second response is to be routed to the host processor device and is sent in the second phase of the persistent memory flush.

2. The apparatus of claim 1, further comprising:
particular persistent memory;
a particular buffer; and
a memory manager to:
write data from a particular cache of another device in the system into the particular persistent memory based on the first request; and
write data from the particular buffer into the non-volatile memory based on the second request.

3. The apparatus of claim 1, further comprising:
processor circuitry;
a particular cache associated with the processor circuitry; and
a memory manager to cause data in the particular cache to be written to persistent memory on another device in the system based on the first request.

4. The apparatus of claim 3, wherein the apparatus comprises a hardware accelerator device.

5. The apparatus of claim 1, wherein the apparatus comprises a switch, the switch is connected to a first downstream device and a second downstream device, and the switch is to:
forward respective instances of the first request to the first and second downstream devices;
receive respective responses to the first request from the first and second downstream devices, wherein the first response is based on information in the responses to the first request from the first and second downstream devices;
forward respective instances of the second request to the first and second downstream devices; and
receive respective responses to the second request from the first and second downstream devices, wherein the second response is based on information in the responses to the second request from the first and second downstream devices.

6. The apparatus of claim 1, further comprising:
error detection circuitry to identify an error in the first phase or the second phase of the persistent memory flush;
wherein the first response identifies whether an error is detected in the first phase and the second response identifies whether an error is detected in the second phase.

7. The apparatus of claim 6, wherein the first response comprises a field to indicate that a particular error is detected in the first phase and the first response further comprises a payload field to indicate attributes of the particular error.

8. The apparatus of claim 1, wherein the second request comprises a field to indicate whether an error was detected in the system in the first phase of the persistent memory flush.

9. The apparatus of claim 8, further comprising logging circuitry to log the error based on the field in the second request.

10. The apparatus of claim 1, wherein the port couples the apparatus to a second apparatus via a link, the link is compliant with a particular interconnect protocol, and the first request, first response, second request, and second response are based on the particular interconnect protocol.

11. The apparatus of claim 10, wherein the particular interconnect protocol comprises Compute Express Link (CXL).

12. A method comprising:
receiving a cache flush request in a first phase of a persistent memory flush flow, wherein the first phase is initiated by a host processor, and the cache flush request requests that data in cache memory be flushed to persistent memory within a system;
determining whether an error occurs in the first phase;
sending a cache flush response in the first phase, wherein the cache flush response identifies whether an error is detected in the first phase;
receiving a memory buffer flush request in a second phase of the persistent memory flush flow, wherein the second phase is initiated by the host processor upon completion of the first phase, and the memory buffer flush request requests that data in buffers of persistent memory devices in the system be flushed to persistent memory; and
sending a memory buffer flush response in the second phase.

13. The method of claim 12, wherein a portion of the cache memory in the system resides in an accelerator device separate from the host processor, and a portion of the persistent memory in the system resides in memory extension devices.

14. A system comprising:
a host processor device comprising:
a core;
host memory; and
protocol circuitry to:
send instances of a cache flush request to a set of devices connected to the host processor device, wherein the cache flush request corresponds to a start of a first phase of a persistent memory flush flow and requests that data in cache memory in the set of devices be flushed to persistent memory, wherein the persistent memory comprises a memory device external to the host memory;
receive a first set of responses to the cache flush request from the set of devices;
determine completion of the first phase based on the first set of responses;
send instances of a memory buffer flush request to the set of devices, wherein the memory buffer flush request corresponds to a start of a second phase of the persistent memory flush flow and requests that a buffer of the memory device be flushed to the persistent memory; and
receive a second set of responses to the memory buffer flush request from the set of devices.

15. The system of claim 14, wherein the first set of responses identifies an error detected during the first phase by another device, and the memory buffer flush request identifies the error.

16. The system of claim 15, further comprising an error log to identify the error, wherein the error log is accessible to system software.

17. The system of claim 14, wherein the host processor comprises a first processor and the system further comprises a second processor coupled to the first processor by a link, the set of devices comprises a first set of devices, and the second processor is connected to a second set of devices, wherein the second processor coordinates with the first processor to manage the first and second phases of the persistent memory flush flow for the second set of devices.

18. The system of claim 14, wherein the host processor further comprises hardware logic to identify an event and the persistent memory flush flow is initiated by the host processor based on the event.

19. The system of claim 14, further comprising the set of devices, wherein the set of devices comprises a switch device, an accelerator device, or a persistent memory device.

20. The system of claim 14, wherein the host processor is connected to each of the set of devices by a respective link, and each of the links connecting the host processor to the set of devices is compliant with Compute Express Link (CXL)-based protocol.

* * * * *